United States Patent [19]
Balderrama et al.

[11] Patent Number: 5,806,071
[45] Date of Patent: Sep. 8, 1998

[54] PROCESS AND SYSTEM FOR CONFIGURING INFORMATION FOR PRESENTATION AT AN INTERACTIVE ELECTRONIC DEVICE

[75] Inventors: Steve Balderrama, Boulder; Larry Salmen; Jerry Schneider, both of Ft. Collins, all of Colo.

[73] Assignee: Info America, Inc., Fort Collins, Colo.

[21] Appl. No.: 518,118

[22] Filed: Aug. 21, 1995

[51] Int. Cl.$^6$ .................................................. H04Q 9/00
[52] U.S. Cl. ...................... 707/104; 395/200.47; 345/327
[58] Field of Search ......................... 364/514 A; 395/357, 395/227, 226, 616, 329, 960, 962, 615, 200.33; 379/74, 434; 340/825.29; 345/327; 707/1, 6, 10, 104

[56] References Cited

U.S. PATENT DOCUMENTS

| | | | |
|---|---|---|---|
| 3,267,436 | 8/1966 | Alpert et al. | 340/172.5 |
| 3,622,995 | 11/1971 | Uselma | 340/153 |
| 3,826,344 | 7/1974 | Wahlberg | 194/2 |
| 3,946,220 | 3/1976 | Brobeck et al. | 235/168 |
| 4,073,368 | 2/1978 | Mustapick | 186/1 C |
| 4,348,551 | 9/1982 | Nakatani et al. | 179/15 M |
| 4,385,366 | 5/1983 | Itousey, Jr. | 364/900 |
| 4,388,689 | 6/1983 | Hayman et al. | 364/401 |
| 4,396,985 | 8/1983 | Ohara | 364/405 |
| 4,415,065 | 11/1983 | Sandstedt | 186/39 |
| 4,449,186 | 5/1984 | Kelly et al. | 364/407 |
| 4,530,067 | 7/1985 | Dorr | 364/900 |
| 4,547,851 | 10/1985 | Kurland | 364/401 |
| 4,553,222 | 11/1985 | Kurland et al. | 364/900 |
| 4,567,359 | 1/1986 | Lockwood | 235/381 |
| 4,569,421 | 2/1986 | Sandstedt | 186/39 |
| 4,649,481 | 3/1987 | Takahashi | 364/405 |
| 4,675,515 | 6/1987 | Lucero | 235/381 |
| 4,723,212 | 2/1988 | Mindrum et al. | 364/401 |
| 4,775,935 | 10/1988 | Yourick | 395/357 |
| 4,797,818 | 1/1989 | Cotler | 364/401 |

(List continued on next page.)

OTHER PUBLICATIONS

Info America, Inc. Touch Wave 300 brochure (1991), 2 pgs.
Par Microsystems POS register system brochure (1990), 4 pgs.
Order Point Customer Ordering station brochure (1995), 2 pgs.
Panasonic POS III System brochure (1993), 2 pgs.
POS Panasonic Restaurant Management System (1991), 2 pgs.
Pgs. 545–562 Electronic Comm. Techniques 3rd ed. (1990, 1994).

*Primary Examiner*—James P. Trammell
*Assistant Examiner*—Thomas Peeso
*Attorney, Agent, or Firm*—Macheledt Bales & Johnson LLP

[57] ABSTRACT

A process for configuring electronic information for presentation at an interactive electronic device with which an item may be ordered, including the steps of: providing an original template presentation created at a first location to include a plurality of template items; providing a database to include a plurality of database items; and configuring, using a computer, the information to include each template item that is also a database item. A template data record can be associated with each template item, and a local data record can be associated with each database item. Additionally, a process for presenting display information at an interactive electronic device, including the step of configuring the display information for presentation by tagging as active for display, a cell associated with a template item that is also a database item. Different types of cells can be accommodated. Also, a system for configuring electronic information for presentation at an interactive electronic device, including: an original template presentation created at a first location to include a plurality of template items; a database to include a plurality of database items; and a communications medium for transmitting the original template presentation to a computer; wherein the template presentation includes a set of instructions for configuring, using the computer, the information to include each template item that is also a database item.

22 Claims, 14 Drawing Sheets

U.S. PATENT DOCUMENTS

| | | | |
|---|---|---|---|
| 4,825,045 | 4/1989 | Humble | 235/383 |
| 4,882,475 | 11/1989 | Miller et al. | 235/383 |
| 5,077,607 | 12/1991 | Johnson et al. | 358/86 |
| 5,128,862 | 7/1992 | Mueller | 364/405 |
| 5,235,509 | 8/1993 | Mueller et al. | 364/405 |
| 5,353,219 | 10/1994 | Mueller et al. | 364/405 |
| 5,576,951 | 11/1996 | Lockwood | 395/227 |
| 5,594,791 | 1/1997 | Szlam et al. | 379/265 | ns
PROCESS AND SYSTEM FOR CONFIGURING INFORMATION FOR PRESENTATION AT AN INTERACTIVE ELECTRONIC DEVICE

BACKGROUND OF THE INVENTION

In general, the present invention relates to processes and systems that can offer for sale, items (both wholesale and retail prepared fast-food, packaged foods, dry goods, and other consumer products), in a self-service fashion using a touch-screen display, computer key board, telephone keypad or receiver, microphone, or other electronic device capable of accepting and transmitting a customer's input. More particularly, this invention relates to a new process and system that can combine a complex multi-media template presentation created at, for example, corporate headquarters of a chain of sales outlets, along with information from a database containing items intended for sale at any sales outlet of the chain, and automatically configure a tailor-made presentation for use on a customer-interactive device at the outlet (such as a store, restaurant, kiosk, cart, or other "point of access").

A multi-national corporation in the business of selling consumer products, especially one that owns many sales outlets, may have millions of interactions each day between customers and company sales clerks. In order to increase sales, yet contain costs, many of these corporations are interested in decreasing their large number of daily in-person customer-clerk interactions by offering goods for sale through electronic devices, such as customer activated terminals (both on- and off-site), home personal computers (connected with the Internet), televisions (connected to cable TV channels via hardwire or satellite dish), and telephones. With the increased use of such electronic devices, a demand for flexible computer systems that can automatically deliver multi-media presentations (and timely update these presentations) and accept customer orders, has been created.

Currently, a corporation owning 100 (for example) sales outlets, each having its unique stock of goods for sale based upon locale and each offering daily "specials", must initially generate 100 outlet-specific multi-media presentations for use on electronic devices at the outlets. If each of these presentations requires daily updates, then at least 36,500 different presentations will have to be created, de-bugged, and downloaded in one year!

The assignee hereof has designed and implemented processes and a computer system now being used for handling the generation (at its company facility), as well as transmission via modem to each restaurant, of outlet-specific multi-media presentations for fast-food customer activated touch-screen terminals. Daily service and software support, especially manual updating and tracking of outlet presentations, is necessary for these processes and system. Typical in-store hardware currently used for transmitting and presenting a store-specific multi-media display of fast-food items for sale to a customer at a terminal (into which the customer can place an order), is shown in FIG. 1—(details of FIG. 1 will be discussed in connection with the other drawings). Generating restaurant-specific presentations, as well as generating and tracking updates to restaurant-specific presentations, quickly becomes an enormously labor-intensive task as the complexity of a presentation increases (to include audio, still- and motion-graphics, and video), the number of food items being offered at an electronic device increases, the number of store-specific presentations increases, and/or the number of updates to the store-specific presentations increases. In fact, the amount of electronic data requiring manual manipulation in such known automatic restaurant-specific presentation systems can make efficient data management nearly impossible. The new process and system discussed herein address these problems.

SUMMARY OF THE INVENTION

It is a primary object of this invention to provide a process and system to, using both a template presentation created at one location and a database containing items intended for sale at a sales outlet, configure with a computer, electronic information for presentation at an electronic device with which an item (from the outlet), may be ordered. It is also an object of this invention to provide a process and system that can automatically handle modifications to the database or updates to the template presentation, so that they can be included in the presentation at the interactive electronic device on a timely basis.

The advantages of providing such a process and system as described herein are many: (a) Initial generation of many store-specific presentations is unnecessary—instead, one original template presentation can be created to include a complete package of items (plus associated graphics, audio and video messages) and special instructions; using this template along with several different databases of items intended for sale through electronic devices at several sales outlets (i.e., points of access), specific presentations can be configured for the sales outlets; (b) Versatility—the new process and system can be adapted to all kinds of selling techniques and electronic devices through which customers order items; (c) Manual tracking of changes to specific presentations, as well as manual updating of outlet presentations to reflect such changes, is decreased; (d) Response time for making changes to electronic device presentations, and the risk of making mistakes, can be decreased; (e) Presentations at electronic devices can accommodate more-complex multi-media features; and (f) Modifications to electronic device presentations can be made on-site by a sales outlet clerk or manager (thus giving more control to the outlets), while at the same time, headquarters can maintain control over both the complete list of items available for sale at its electronic devices, and item characteristics—(such as graphics, audio and video messages used to portray the items during a presentation).

Briefly described, the invention includes a process for configuring electronic information for presentation at an interactive electronic device with which an item may be ordered, comprising the steps of: providing an original template presentation created at a first location to include a plurality of template items; providing a database to include a plurality of database items; and configuring, using a computer, the information to include each template item that is also a database item. A template data record can be associated with each template item, and likewise a local data record can be associated with each database item. The template and database are preferably maintained separately.

In another characterization, the invention includes a process for presenting display information at an interactive electronic device with which an item may be ordered, comprising the steps of: providing an original template presentation created at a first location to include a plurality of template items; providing a database to include a plurality of database items; and configuring the display information for presentation, to include the step of tagging as active for display, an item cell associated with each template item that is also a database item. Different cell types can be accommodated and tagged for display.

An additional characterization of the invention includes a system for configuring electronic information for presentation at an interactive electronic device, comprising: an original template presentation created at a first location to include a plurality of template items; a database to include a plurality of database items; and a communications medium for transmitting the original template presentation to a computer. The template presentation for the system also includes a set of instructions for configuring, using the computer, the information for presentation to include each template item that is also a database item.

BRIEF DESCRIPTION OF THE DRAWINGS

The invention will be more particularly described by referencing the accompanying drawings of the preferred embodiments, in which like numerals designate like parts.

FIG. 1 also represents a system of hardware capable of carrying out the invention.

FIG. 2 also represent a preferred communication system for carrying out the invention.

DETAILED DESCRIPTION OF THE PREFERRED EMBODIMENTS

Figure 1:
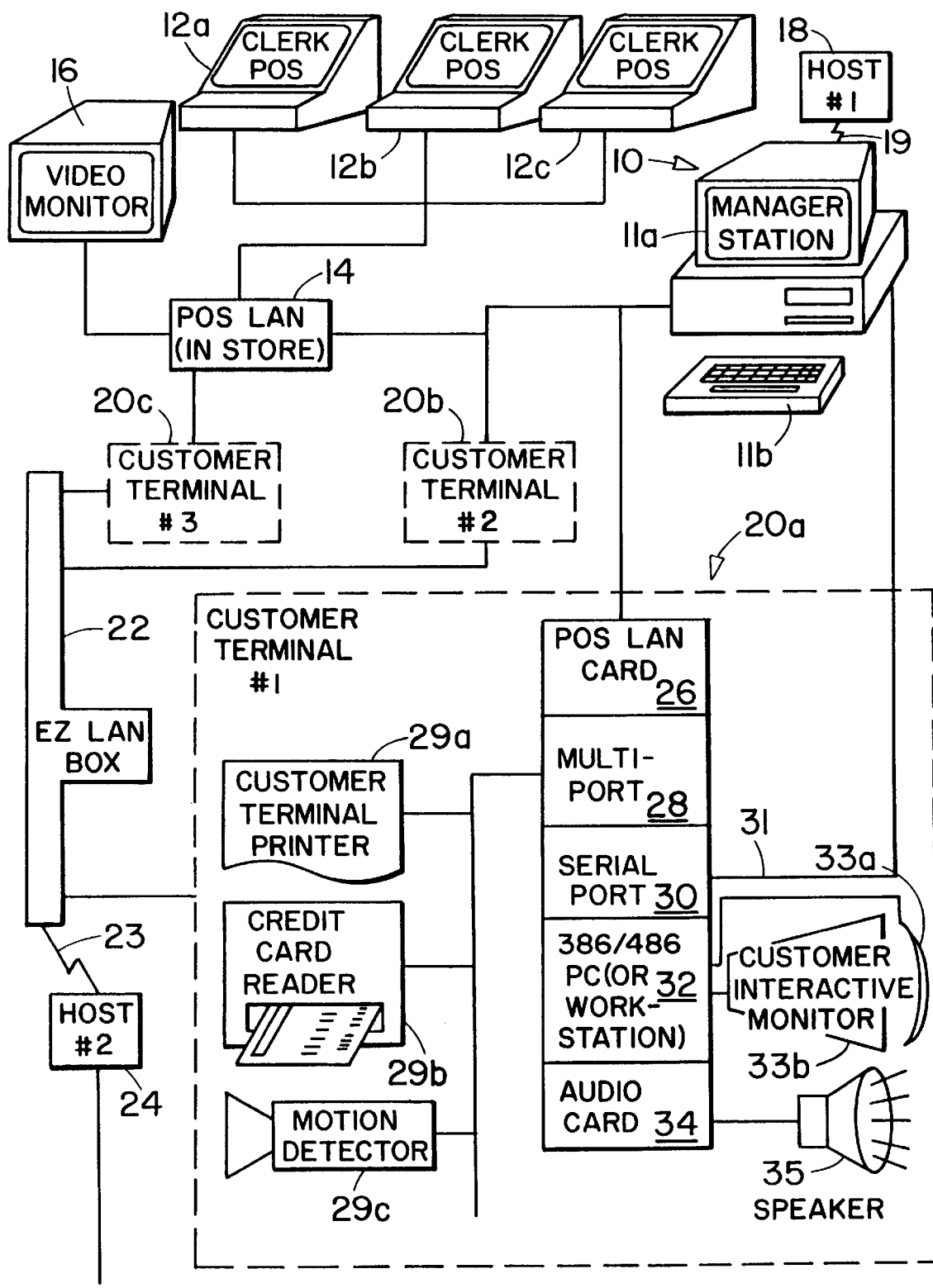
FIG. 1 is a schematic/block diagram of in-store hardware, connected in a manner designed by the assignee hereof, currently used for transmitting and presenting a store-specific multi-media display of fast-food items for sale to a customer at a terminal (into which the customer can place an order).

In FIG. 1, Host #1 box 18 represents a computer (such as a personal computer, workstation, or mainframe) located at, for example, management headquarters of a company having many sales outlets. Line 19 connects box 18 to the manager's station 10 (such as a personal computer, workstation, mainframe computer, etc.). This represents the communication medium through which management headquarters and the outlet manager can "talk". Together, Host #2 at 24 and line 23 connecting it (through connection Box 22) to customer terminals 20a, 20b, 20c, represent a computer system 24 (a personal computer, workstation, mainframe computer, etc.) and communication medium 23 through which a multi-media presentation, and its updates, can be transmitted. Known communication systems (similar to that in FIG. 2) can be used for the transmission and receiving of electronic information from Host processors 18, 24 to manager's station 10 and customer terminals 20a, 20b, 20c. Transmission media suitable for use to connect headquarters with manager's station 10, as well as connect Host #2 with a receiving device (such as an "EZ LAN Box" 22), includes telephone line(s) connected at each end to a modem (or other hardwired system), full-duplex Wide Area Network wiring, or magnetic media onto which electronic information is stored and delivered to the outlet.

As is well known, each customer terminal 20a, 20b, 20c, the manager's station 10 (operated by, or at the direction of, the outlet's management), each Point-of-Sale (POS) terminal 12a, 12b, 12c (suitable POS systems include model 3230 from PAR Microsystems Corp.) used by the clerks who take orders in-person at an outlet front or back counter (or drive-through window), and the video monitor 16 (located where stock is pulled for satisfying an order—such as the restaurant kitchen), are all connected to a known POS Local Area Network (LAN) 14 within the outlet. Suitable LANs include an ethernet (available from PAR Microsystems Corp.), arcnet, RS-485, or RS-232 LAN. It is preferred that the customer terminals 20a, 20b, 20c and clerk-operated POS terminals 12a, 12b, 12c be connected to the stockroom video monitor 16 so that an order can be communicated to the person pulling items from stock for delivery to a customer. The manager's station 10 is, oftentimes, also connected to the customer and clerk POS terminals so that data pertaining to inventory levels, revenue, sales, purchase trends, etc., can be collected and analyzed for use at the outlet and headquarters. Manager's station 10 is shown with a monitor 11a and key board 11b so that information can be entered via touch-screen or key board.

Dashed-line box 20a (representing a customer terminal), encompasses one example of a typical hardware set up (including peripherals) currently being commercially used in the fast-food industry. In-store POS LAN 14 is connected through a POS LAN card 26.

The customer terminal includes a multi-port connection, represented by box 28, which communicates with peripherals such as a printer 29a, credit card reader 29b, and motion/proximity detector 29c. Also included is a serial port connector, represented by box 30, that allows direct communication 31 with another computer (such as the manager's station 10). Connected to the processor 32 (such as Intel Corporation's "386", "486", or "PENTIUM" processors commercially available and used widely in personal computers) is a monitor 33b (such as a VGA-compatible monitor available from Sony, NEC, and Goldstar) having a touch-screen display 33a. Audio card 34 allows for connection with a speaker that can relay sound messages to a customer. Although not shown, a microphone could be also connected to the customer terminal system 20a so that audio messages from the customer could be fed into a transducer for transmission through the in-store POS LAN 14 to the clerk POS terminals 12a, 12b, 12c or inventory video monitor 16.

As it is well known, a digital computer (like those at 10, 18, 24, 20a) typically consists of a central processing unit (CPU), memory (usually with three storage elements: instructional storage, a program storage, and data storage), and several peripherals (examples: magnetic disk, printer, mouse, all attached through I/O ports). Host #1 and #2, although shown by separate boxes, could be the same computer. Optionally, hosts #1 and #2 could be two separate computers at the same physical location (such as management headquarters, on an upper floor of a building within which the customer terminals are located, or at a third party's facility). An EZ LAN Box is shown for receiving information from Host #2. Host #2 could be connected directly to each customer terminal. However, preferably Host #2 is directly connected to in-store LAN 14, or to manager's station 10, for more-direct communication with the station 10. The customer terminals (20a, 20b, 20c), although shown in more detail at 20a to have individual processing units, can be replaced with a single processor connected to several customer presentation devices. Electronic devices suitable for use include: a touch-screen on a Cathode Ray Tube CRT monitor, a flat-panel Liquid Crystal Display LCD screen, or a Light Emitting Diode LED screen; a computer key board; a telephone key-pad or receiver; or a microphone. Likewise, each clerk POS terminal (12a, 12b, 12c) could have its own processor, or a single POS processor could be connected to several devices capable of accepting a clerk's input.

Figure 2:
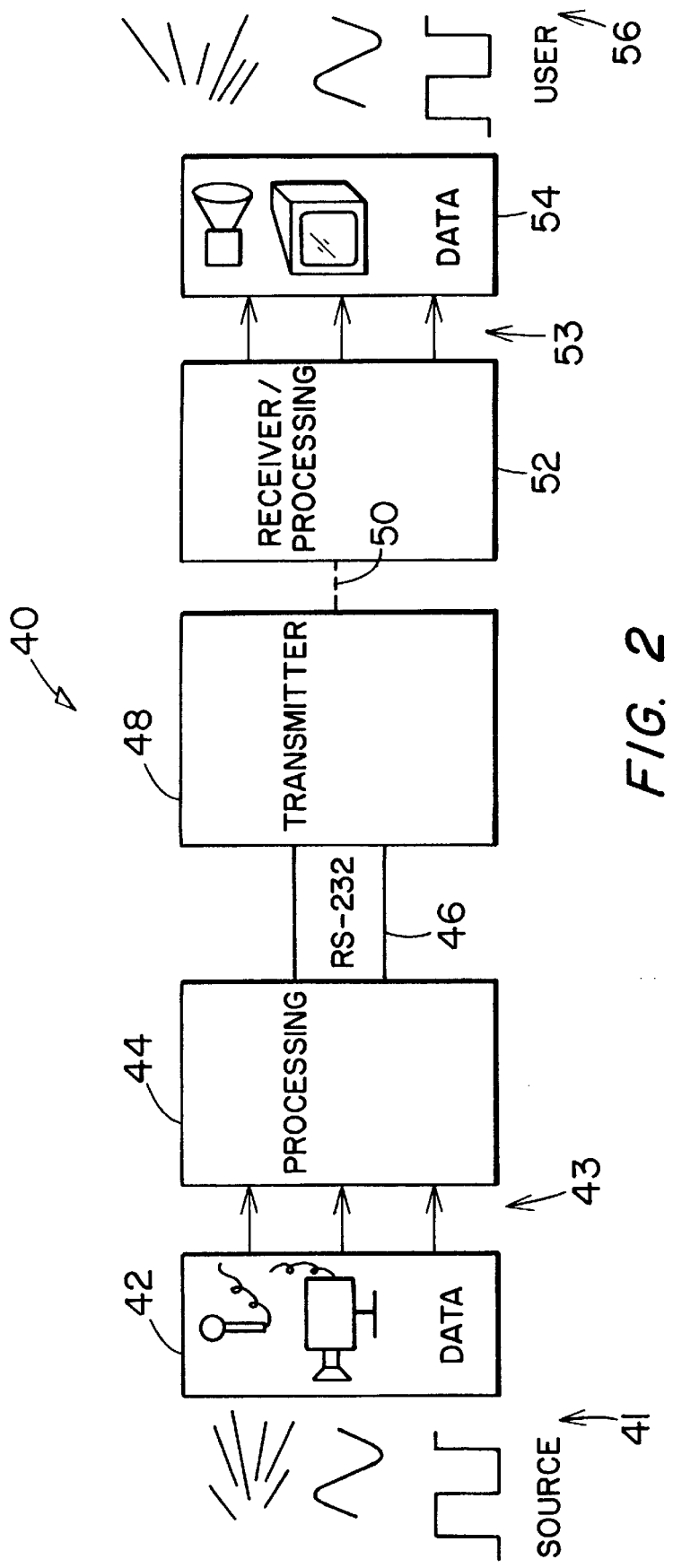
FIG. 2 illustrates, in block diagram form, a typical well known electrical signal communication system used to transmit data from a Source to a User of the data.

Communication systems, such as the one at 40 in FIG. 2, are currently available for sending and receiving analog (i.e., continuous-wave) or digitally-recorded (i.e., in the form of bits) audio and visual signals, as well as analog or digital computational data. Designs of such communication systems are readily understood in the art. Box 42 represents transducers of source information: a microphone is the transducer for converting energy in the form of sound pressure waves into electrical energy/information/data; and a TV or video camera converts visual images into electrical video signals. Further electronic processing can convert analog signals into a digital format. Digitally-stored DATA (such as that on a compact disk) is typically ready for processing once read. Information which has been properly converted into a chosen electrical signal form, is input at 43 into a central processing unit 44 (such as an IBM-compatible personal computer). The transmitter (a peripheral such as a modem) represented by box 48 can be connected to the processing unit 44 via an Electronics Industry Association (EIA) standard RS-232-C communications interface 46 (i.e., a connector having 25 pins, typically attached to a cable with specified voltage levels and signal parameters, for joining two units).

Dashed line 50 represents suitable transmission medium that allows information from the Source 41 to get to the User 56 for reproduction in a chosen form (such as audio messages, or moving-graphics/animation, video, alphanumeric characters on a screen). Known types of transmission medium 50 include telephone and cable TV transmission wires, coaxial cables, and fiber-optic (glass) cables. Additionally, other dielectric-material media, such as a microwave radio or satellite link (which utilize earth's atmosphere or space) can be used to transmit information from one location to another. Chapter 13, pgs. 545–562, of *Electronic Communication Techniques* (3rd edition, copyrighted 1994) by Paul H. Young, incorporated herein by reference, has further design details for various electronic data communication systems using different transmission media. Data received by receiver/processor 52 is processed and then input 53 into appropriate transducers, represented by box 54, for communication in the proper form to user 56.

Figure 3:
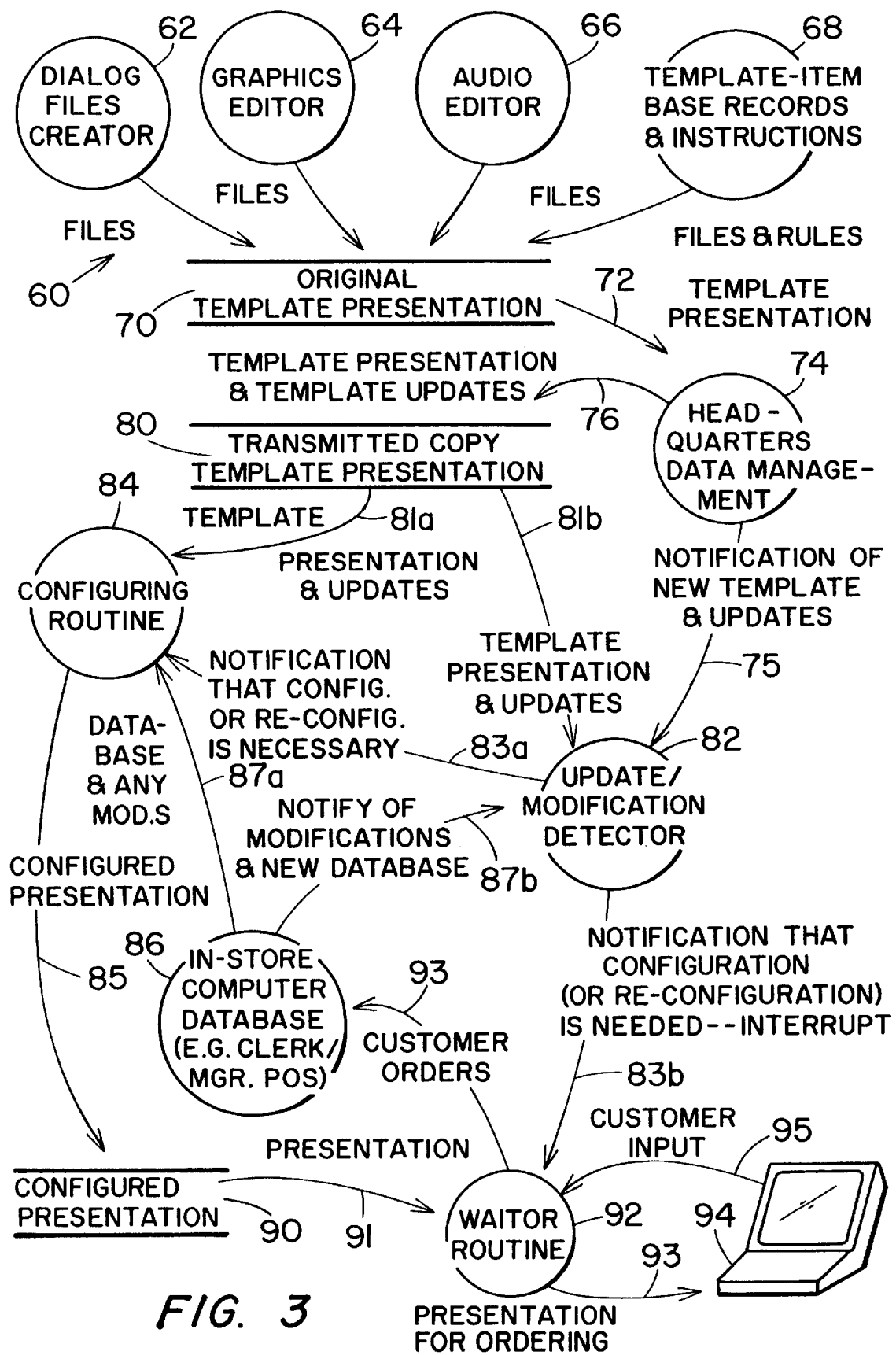
FIG. 3 is a schematic representing data flow for a preferred process and system of the invention.

The data flow diagram of FIG. 3 illustrates the types of files and instructions, shown generally at 60, which can be compiled as desired to create an original template presentation 70 that includes a complete package of items (and still- and motion-graphics, audio and video messages, alphanumeric characters, etc., associated with a presentation) and special instructions/subroutines. The dialog files creator, represented by circle 62, is used to create dialog control files that: (a) control general sequencing of the template presentation items, whether arranged by screen display or order of audio message presentation; (b) define default parameters for presentation units, such as screen displays; as well as (c) specify when special functions take place. The graphics editor, represented by circle 64, is preferably a graphics image editor that can create digital graphic files (such as well known PCX, PCC, GIF, or TIF files) for graphic and icon display images included in the presentation. Currently-available graphics and icon creation tools suitable for use include "PUBLISHER'S PAINTBRUSH" supplied by Zsoft, "CORELDRAW" supplied by Corel, and Adobe's "PHOTOSHOP". Audio editor 66, represents an audio editor for producing files compatible with audio cards (34 in FIG. 1) used in the customer terminal (for example, if a "SOUNDBLASTER" audio card supplied by Creative Systems Labs is used, one can use an audio editing tool is called "WaveEdit" also supplied by Creative Systems Labs).

Circle 68 represents the editor capable of creating and updating the expanded/ complete group of data files that contain information about all items available for purchase by all outlets, collectively. This group of new template data files will be explained in greater detail in connection with other figures. Generally speaking, this group of template data files contain: a listing of items for sale, associated icons, graphics, and audio messages; layouts for screens and item cell locations; branch menu cells which point to/call-up associated ordering screens; standard branch cells that call-up a previous or later screen; overflow and hidden branch cells which point to overflow or hidden screens (only seen if certain conditions have been met); instructions for configuring a site-specific customer presentation from the original template presentation 70 (including dialog control files and subroutines—see, also, FIG. 4 step 104, FIGS. 5 and 6 step 136, and FIG. 12); instructions for re-configuring a customer presentation (see, also, step 116 in FIG. 4); and, as needed, instructions for determining which portion of the data needs re-configuring and whether configuration is necessary (see FIG. 4 step 110, and FIGS. 5 and 6 step 130).

TABLE A gives examples of the types of template data records that are preferably incorporated into a template presentation of the invention created for a computer monitor (with, preferably, a touch-screen customer interface). The records shown are itemized by cell on a display screen and organized in tracks with ordinal numbers to define positions within tracks. The organization of data records will be further discussed in connection with FIGS. 7–11. Each screen generally represents a category of items (by way of example, food items)—such as TACOS, TACO OVERFLOW, BURRITOS, DRINKS, and a MAIN MENU. The types of cells on TABLE A associated with data records, include: item cells; menu branch cells; general cells not associated with an item (such as an "EXIT to PAY" cell); and overflow and hidden branch cells. For example, track #1/ordinal #1 of the TACOS screen contains an item cell associated with item (1); it has an itemidentifier string "REGTACO" and a template Price Look-Up (PLU) key, or other item sequence number, of 001. The "order window" cell on the TACOS screen is not associated with any particular item; the location of this cell (track #0) is fixed in the template presentation. During configuration, this cell will be activated but will not move. Associated with the MAIN MENU screen are three menu branch cells and one hidden branch cell (see also FIG. 11). Additional data fields (not shown) can be associated with each cell, such as an icon, animated graphics, audio and video messages, and text. The far right-hand data fields will be explained along with TABLES B, C and FIGS. 12, 13.

known restaurant-specific presentations created for transmission to each restaurant: (a) a dialog files creator and editor; (b) a commerciallyavailable graphics editor; (c) a commercially-available audio editor; and (d) restaurantspecific data files, tailored to a particular fast-food restaurant, containing food items for sale, associated icons, graphics, and audio messages, screen and item cell location layouts, branch menu cells which point to/call-up associated ordering screens, and standard branch cells that call-up a previous or later screen (two examples of standard branch cells are as follows: an "EXIT to PAY" cell that, depending upon programmed sequencing, calls-up either a suggestive-sell question screen or the "THANK YOU for Your Order" screen; and a cell location labeled "OTHER FOOD" cell that calls-up a menu screen).

Returning to FIG. 3, arrow 72 represents the flow of the created original template presentation 70 into a corporate headquarters' data management routine 74 (which could be stored on a processor located at corporate headquarters, on-site or upstairs of the sales outlet, or at the facility of a third party handling software service/support). Routine 74 preferably contains the capabilities of gathering and analyzing inventory, revenue, sales, purchase trends, etc., data. Routine 74 can also contain the capability, as shown, of providing notification (via data flow arrow 75) to Detector

TABLE A

TEMPLATE RECORDS (example)

| screen type | track#/ ordinal# (if exists) | cell type | item identifier- string | template PLU | Inactive/ Active tag | "mapped" PLU |
|---|---|---|---|---|---|---|
| TACOS | 1/1 | item (1) | REGTACO | 001 | A | 004 |
|  | 1/2 | item (2) | CHIKTACO | 002 | I | — |
|  | 1/3 | item (3) | TACO-SUP | 003 | A | 002 |
|  | 1/4 | item (4) | 7-LAYTAC | 004 | I | — |
|  | 1/5 | item (5) | SOFTACO | 005 | A | 003 |
|  | 1/6 | fixed branch |  |  | I | — |
|  | 0/order window | fixed general |  |  | A | — |
|  | 0/EXIT to pay | fixed general |  |  | A | — |
|  | 0/cancel item | fixed general |  |  | A | — |
|  | 0/repeat item | fixed general |  |  | A | — |
| TACO OVER- FLOW | 1/1 | item (6) | BFASTTAC | 006 | I | — |
|  | 1/2 | item (7) | BEANTACO | 007 | A | 001 |
|  | 1/3 | item (8) | TACO-SPX | 008 | I | — |
|  | 1/4 | item (9) | TACO-SPY | 009 | I | — |
|  | 1/5 | item (10) | TACO-SPZ | 010 | I | — |
| BURRITOS | 2/1 | item (1) | BURR-SUP | 011 | A | 007 |
|  | 2/2 | item (2) | BFASTBUR | 012 | I | — |
|  | 2/3 | item (3) | 7-LAYBUR | 013 | A | 008 |
| DRINKS | 3/1 | item (1) | PEPSI | 014 | A | 005 |
|  | 3/2 | item (2) | DR.PEPP | 015 | A | 006 |
| MAIN MENU | 1/1 | menu (1) branch | TACOMENU |  | A | — |
|  | 2/1 | menu (2) branch | BURRMENU |  | A | — |
|  | 3/1 | menu (3) branch | DRINMENU |  | A | — |
|  | 4/1 | hidden branch |  |  | I | — |

Contrasting the original template presentation of the invention, are the outletspecific multi-media presentations (designed and implemented by the assignee hereof) currently in use at fast-food customer activated touch-screen terminals. The following elements can be found in such routine 82 that a new template or an update to a template has been identified by data management routine 74. As arrow 76 indicates, the original template presentation and any updates made to the presentation along the way, form the so-called transmitted copy 80 of the original template. Template presentation copy 80 flows, as represented by arrow 81a, into the Configuring routine 84. In the event the template presentation includes, as suggested above, instructions (or a portion of the full set of instructions) for determining whether configuration is necessary, this information would need to flow along 81b into update/modification Detector routine 82 so that the Detector can perform its functions: (a) provide notification along 83b to Waitor routine 92 (directly connected to the electronic presentation device 94 used by a customer), to interrupt a currently-running presentation so that configuration or re-configuration can take place to update the customer presentation; and (b) notify, along arrow 83a, and trigger the Configuring routine 84 into configuring or re-configuring the presentation (which then flows along arrows 85, 91, and 93 to customer terminal 94).

Database records and files are represented in FIG. 3 by circle 86 labeled as "instore computer". These records and files 86 (referred to throughout as database records or files) contain data records/information about items intended for sale at a particular sales outlet (such as a store, restaurant, kiosk, cart, or other "point of access"). As will be described in more detail below, TABLE B itemizes the type of information preferably included in the database records for a particular outlet (in this case, a restaurant). Although shown to be located on an in-store computer, it is not necessary that database records and files be created and/or stored on a computer (such as the manager station 10, one or each of the clerk POS terminals 12a, 12b, 12c, or one or each of the customer terminals 20a, 20b, 20c—all shown in FIG. 1) located within the sales outlet. Instead, these database records and files 86 can be created on a separate computer from, but at the same location as, the computer used to create the original template presentation 70. The database records and files 86 might also be created with the same computer (but created at a different time) as that used to create the template presentation 70. It is, nevertheless, preferred that the original template presentation 70 and the database 86 be created to form separately stored and maintained files and data. This is so that sales outlet personnel (most-likely store managers) can control, if desired, the creation and modifying of their own database of items they intend to sell over the course of a day, for example.

Arrow 87a illustrates the flow of database files/records, and any modifications thereto, into the Configuring routine 84 so that a presentation can be configured or reconfigured (shown at 90) for the sales outlet customer terminal 94. In the event a database is modified by, for example, adding or deleting a data record associated with an item, modifying a field containing item price or tax rate, or time-delaying the presentation of a store daily "special", it may be preferred to notify (along data flow arrow 87b) the update/modification Detector 82 so that the Detector 82 can take appropriate action. And finally, the routine labeled "Waitor" at 92 in FIG. 3, merely performs the task of giving a configured presentation to a customer using an electronic device (like that shown at 94).

Turning to TABLE B, store/outlet personnel typically prefer using the commonname of items for quick recognition of items being included in a database list they are creating for their store. Therefore, item common-names are included in TABLE B. Note that database Price Look-Up (PLU) numbers for items vary from outlet to outlet—and database item PLU numbers seldom match item PLU numbers in a template presentation.

TABLE B

DATABASE ITEMS/RECORDS (example)

| item common-name | item identifier-string | Point-of-Sale system PLU | item price/ tax rate (or code) | exists on template list? |
|---|---|---|---|---|
| bean taco (w/cheese) | BEANTACO | 001 | $0.78/A(3%) | yes |
| taco supreme | TACO-SUP | 002 | $1.00/A(3%) | yes |
| soft-shell taco | SOFTACO | 003 | $0.66/A(3%) | yes |
| hard-shell taco | REGTACO | 004 | $0.66/A(3%) | yes |
| pepsi cola | PEPSI | 005 | $0.99/B(4%) | yes |
| Dr. Pepper | DR.PEPP | 006 | $0.99/B(4%) | yes |
| Burrito Supreme | BURR-SUP | 007 | $1.00/A(3%) | yes |
| 7-Layer Burrito | 7-LAYBUR | 008 | $1.44/A(3%) | yes |
| chicken sandwich | CHIKSAND | 009 | $2.22/A(3%) | NO |
| french fries | F.FRIES | 010 | $0.55/A(3%) | NO |

TABLE C

CONFIGURED item-LIST
(includes all database items that are also template items)

| screen type | track#/ ordinal# | cell type | item identifier-string | "mapped" PLU | Inactive/ Active tag |
|---|---|---|---|---|---|
| TACOS | 1/1 | item (1) | REGTACO | 004 | A |
|  | 1/3 | item (3) | TACO-SUP | 002 | A |
|  | 1/5 | item (5) | SOFTACO | 003 | A |
|  | 1/2 | item (7) | BEANTACO | 001 | A |
| BURRITOS | 2/1 | item (1) | BURR-SUP | 007 | A |
|  | 2/3 | item (3) | 7-LAYBUR | 008 | A |
| DRINKS | 3/1 | item (1) | PEPSI | 005 | A |
|  | 3/2 | item (2) | DR.PEPP | 006 | A |

Therefore, it is important to associate each item in the database with some type of standard or "key", such as an item identifier-string (alphanumeric sequence, integer, or real numbers) that can be matched to item identifier-strings contained in the template. An item price/tax rate (or code) field has been included so that store personnel can timely react to local price and tax rate changes. Other data fields could be included in the database item listing. As more information is included in the database, more parameters become modifiable by store personnel—thus increasing the amount of local/store control over the list of items (and their associated characteristics) offered for sale at the store.

Although more control has been given to sales outlets by the new process and system described herein, as designed, the configuration/re-configuration of an original template presentation (such as that shown in TABLE A) with a database (such as that shown in TABLE B), allows headquarters (or any other location having direct responsibility over a local outlet) overall control over the items and their characteristics as presented to a customer. For example, TABLE B includes two items (chicken sandwich and french fries) not included in the template presentation. As will be described in more detail in connection with FIGS. 12 and 13, the example configured item-list TABLE C, which contains those items that will be presented to a customer, does not include the chicken sandwich and french fries. By comparing the three TABLES A, B, C, it can be clearly seen that TABLE C only includes those database items (TABLE B) that have been matched with a similar template item (from TABLE A). Due to differences in PLU numbers between the database list and the template list (as well as likely differences in the common-names used locally, local prices of items, local tax rates, etc.), item matching is preferably done by comparing item identifier-strings (or another item-matching "key" that has been standardized) in the database and the template presentation.

Figure 4:
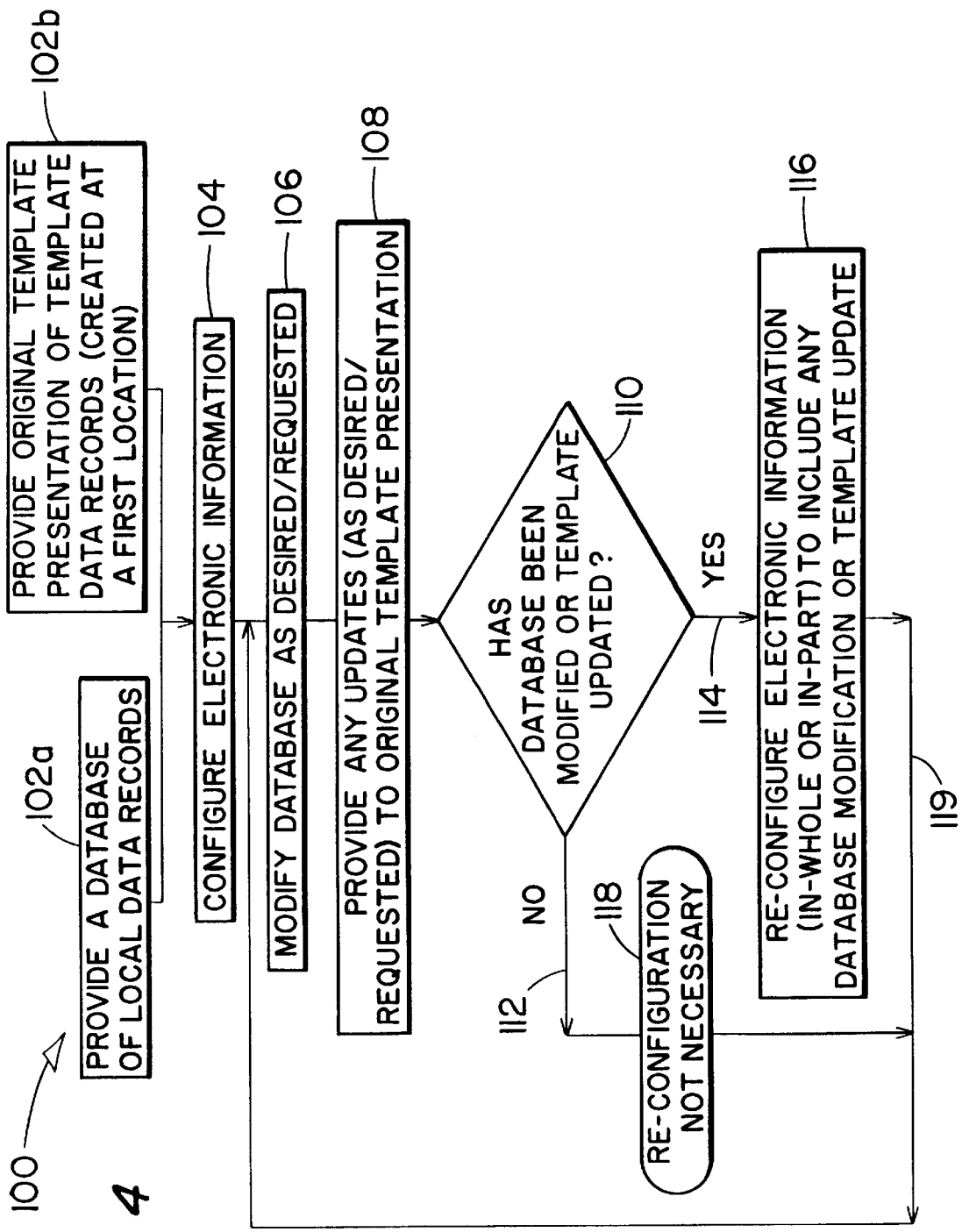
FIGS. 4 and 5 are flow diagrams illustrating features of preferred methods of the invention.

The flow diagram in FIG. 4 represents one preferred process 100 of the invention. After an original template presentation has been created 102*b* and a database of local records provided 102*a*, configuration 104 of electronic information for presentation at an interactive electronic device takes place utilizing a configuring routine (as represented in FIG. 3 at 84). Configuration preferably takes place, to increase efficiency and outlet flexibility, on a computer processor located at the sales outlet (such as the manager's station 10, one or all of the clerk POS terminals 12*a*, 12*b*, 12*c*, or one or all of the customer terminals 20*a*, 20*b*, 20*c*—all shown in FIG. 1). However, this is not necessary. Original template presentations may be created and configured with local databases at the same location, or a template and database could be configured at a third party software service/support facility, and then transmitted to the store (with a communication system as shown in FIG. 2) for downloading to a customer terminal. It is important that the new process and system allow for database modifications 106 (described above in connection with FIG. 3), as well as original template presentation updates 108 (such as: providing a new template presentation; modifying instructions or dialog control files within the original template; making the presentation of an item time-dependent over some period of time (such as certain hours in a day, or days in a week); adding or deleting a data record associated with an item; and modifying a field containing an icon, motiongraphics/animation message, a video or audio message, etc.). If database modifications or template updates are made (110, 114), re-configuration 116 is necessary to change the presentation to a customer. If no modifications or updates have been made (110, 112), no subsequent configuration, or re-configuration, would be necessary 118. A loop 119 has been formed to represent that, as time passes, the database may need to be modified and/or the original template may need updating.

Figure 5:
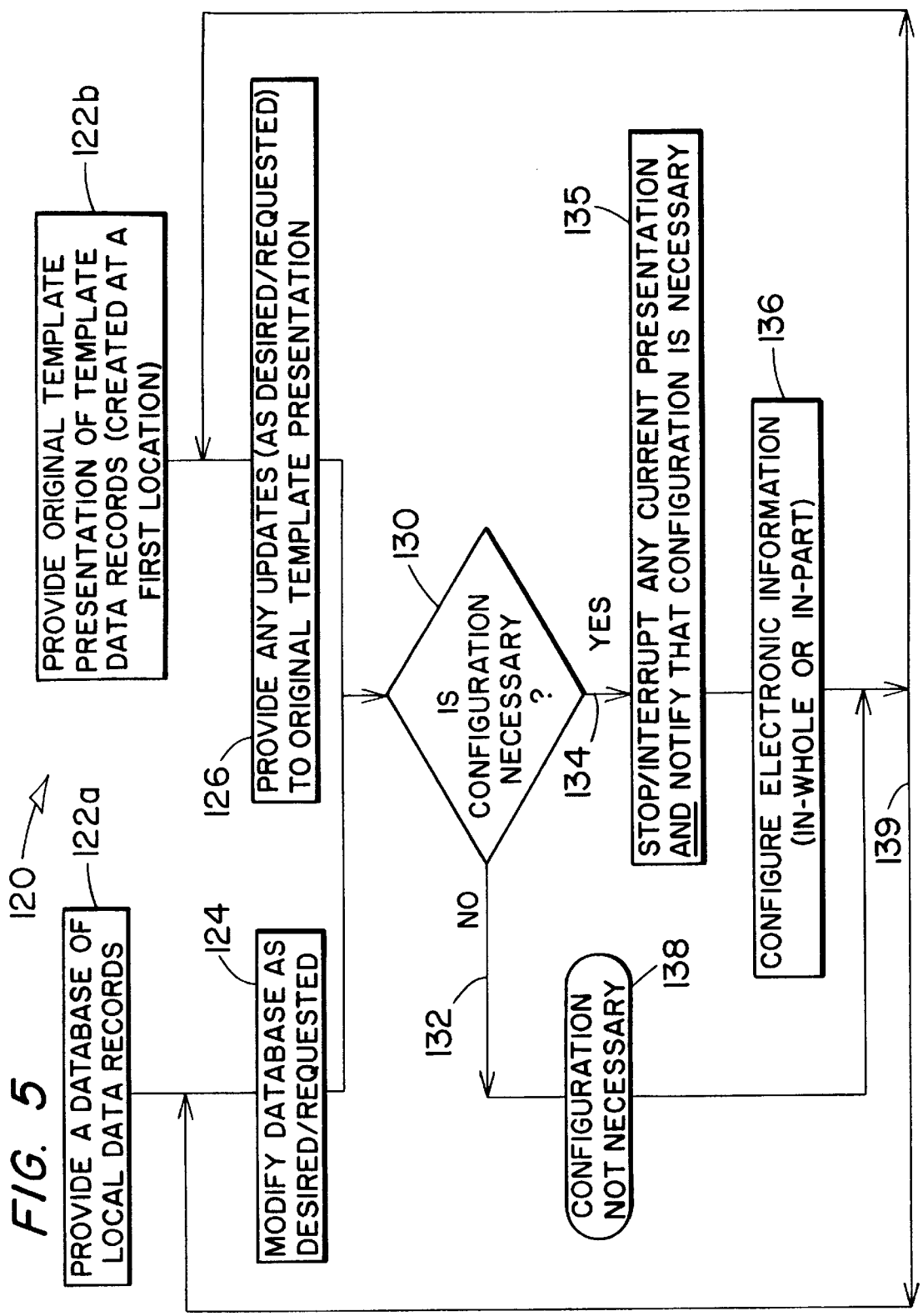

The flow diagram in FIG. 5 represents another preferred process 120 of the invention. As shown, after an original template presentation has been created 122*b* and a database of local records provided 122*a*, modifications to the database 124 and updates to the template 126 might occur before configuration (utilizing FIG. 3 routine 84) takes place 136. As shown in FIG. 5, before configuration takes place 136, one might want to determine whether configuration is necessary 130. If so (134), and if a presentation has already been downloaded to an electronic presentation device, interruption of the current presentation (135) may be required. Additionally, as discussed in connection with FIG. 3, it may be helpful to provide notification that configuration is necessary (here, configuration step 136 also encompasses "re-configuration", or subsequent configuration, in the case where configuration has already been done at least once). Also shown, configuration step 136 is bypassed in the event configuration is not necessary (132, 138).

The FIG. 5 embodiment clearly illustrates the flexibility of the process and system of the invention. The loop 139 formed in FIG. 5 represents that, as time passes, either database modifications 124 and/or original template updates 126 may take place necessitating a subsequent configuration, or re-configuration, to change the customer presentation in-whole or in-part (as already mentioned, this concept of re-configuration has been incorporated into the configuration step 136 of process 120).

Figure 6:
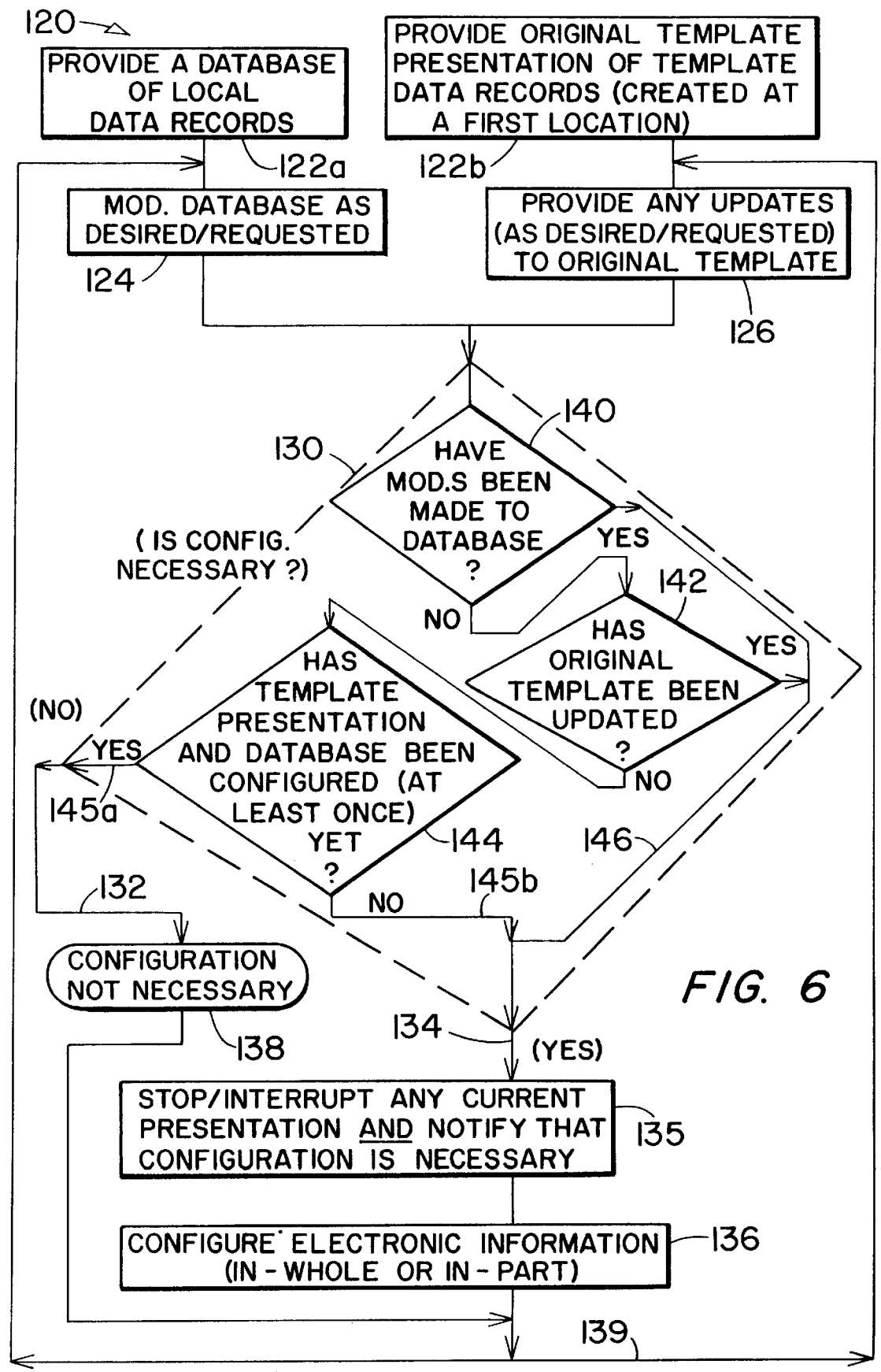
FIG. 6 is a flow diagram illustrating the flow diagram of FIG. 5 in greater detail.

FIG. 6 provides details for step 130 of the FIG. 5 preferred process 120. As shown 140, 142, if either the database provided 122*a* is modified 124 or the original template presentation provided 122*b* is updated 126, then (following arrows 146 and 134) configuration of the electronic information (in-whole or only the affected in-part) is necessary 136 for presentation at a customer electronic device. In the event only a part of the database is modified 124 or only a part of the template updated 126, the system preferably detects which portions of the customer presentation is affected by the modifications or updates, to configure (or re-configure) only the part of the presentation affected. As FIG. 6 shows (along arrow 145*b*), it is possible that no database modifications are made 140 and no template updates are made 142 before the first time configuration of the template and database takes place; in this case (following arrows 146 and 134) configuration of the electronic information (in-whole) would be necessary 136.

As mentioned above in connection with FIG. 5, FIG. 6 illustrates a point (box 135) at which a current presentation could be interrupted and notification given that configuration (or "re-configuration" in the case where configuration has already been done at least once) is necessary. This is especially important if a single-user operating system has been employed to both perform configuration and run a presentation at an electronic device. And finally, if it is determined that (a) no database modifications have been made 140, (b) no template updates have been made 142, and (c) the template presentation and database have already been configured 145*a* (following arrow 132 to bypass configuration step 136), one can see that configuration is not necessary 138.

Figure 7:
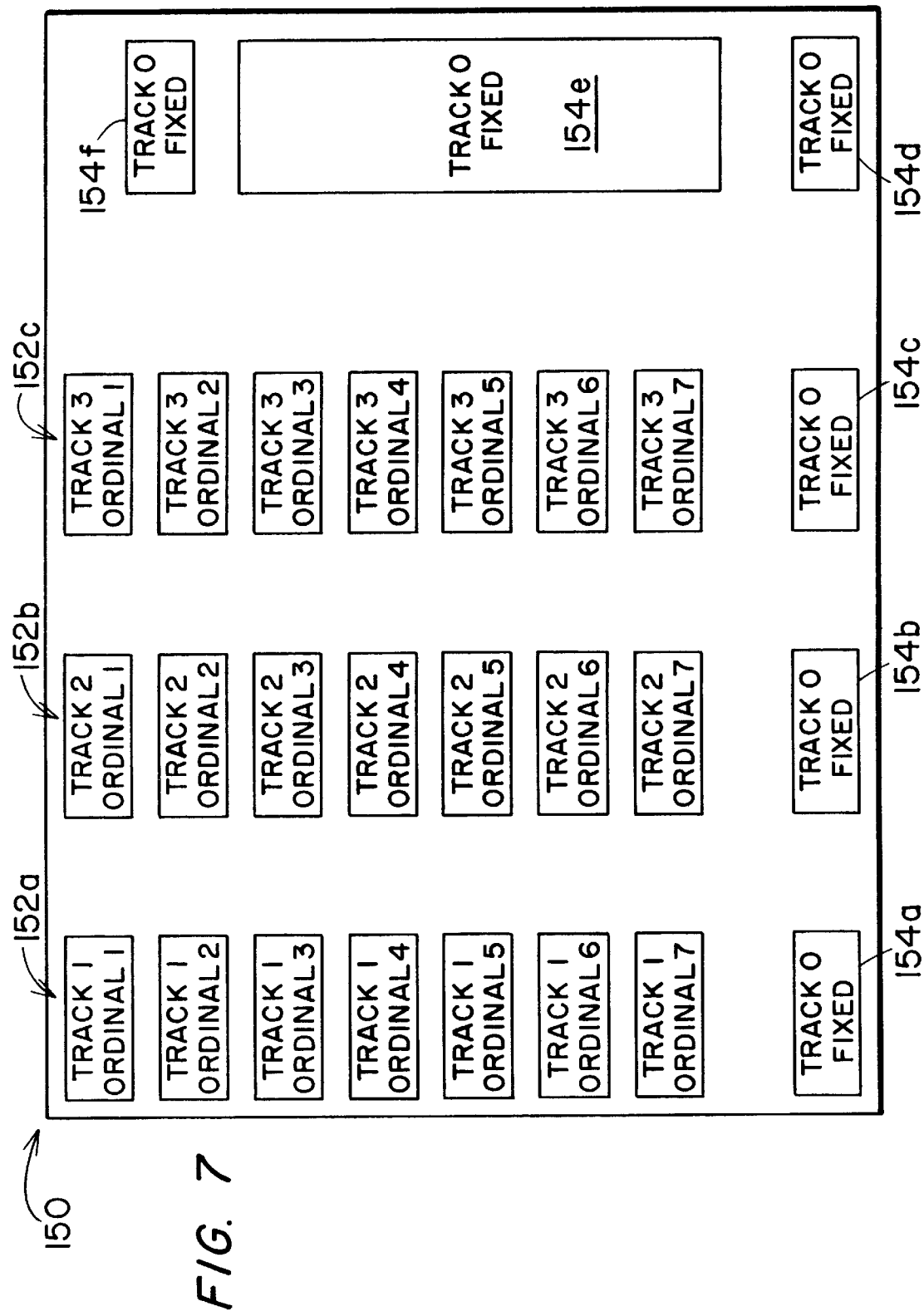
FIG. 7 is a schematic illustrating one embodiment of "cell" organization on a template presentation display 150. Each cell location (shown organized in "tracks") is represented by a box.

The original template display at 150 in FIG. 7 illustrates how cells are preferably grouped in tracks along, for example, columns 152*a*, 152*b*, 152*c*. Ordinal numbers 1 through 7 are shown associated with each track to locate where cells fit within a track. In this example, Track 1 groups cells containing icons for seven items of one category, Track 2 groups cells containing icons for seven items of a second category, etc. Cells labeled "fixed" (154a through 154f, with track #0) will not be reorganized/relocated in a customer presentation. These fixed cells will typically be general cells not associated with any particular item for sale, and are activated during the configuration process to appear on a presentation display in the same place regardless of the number of item cells on that display. For example, cell 154e is preferably an "order window" listing items and a running total of the prices of items ordered by a customer. It is desirable to include an order window cell for every display containing item cells representing items being offered for sale. Cell 154f could enclose an "OTHER FOOD" icon that calls-up a previous menu display. Cell 154d might have an "EXIT to PAY" icon to end a customer's order.

Figure 8:
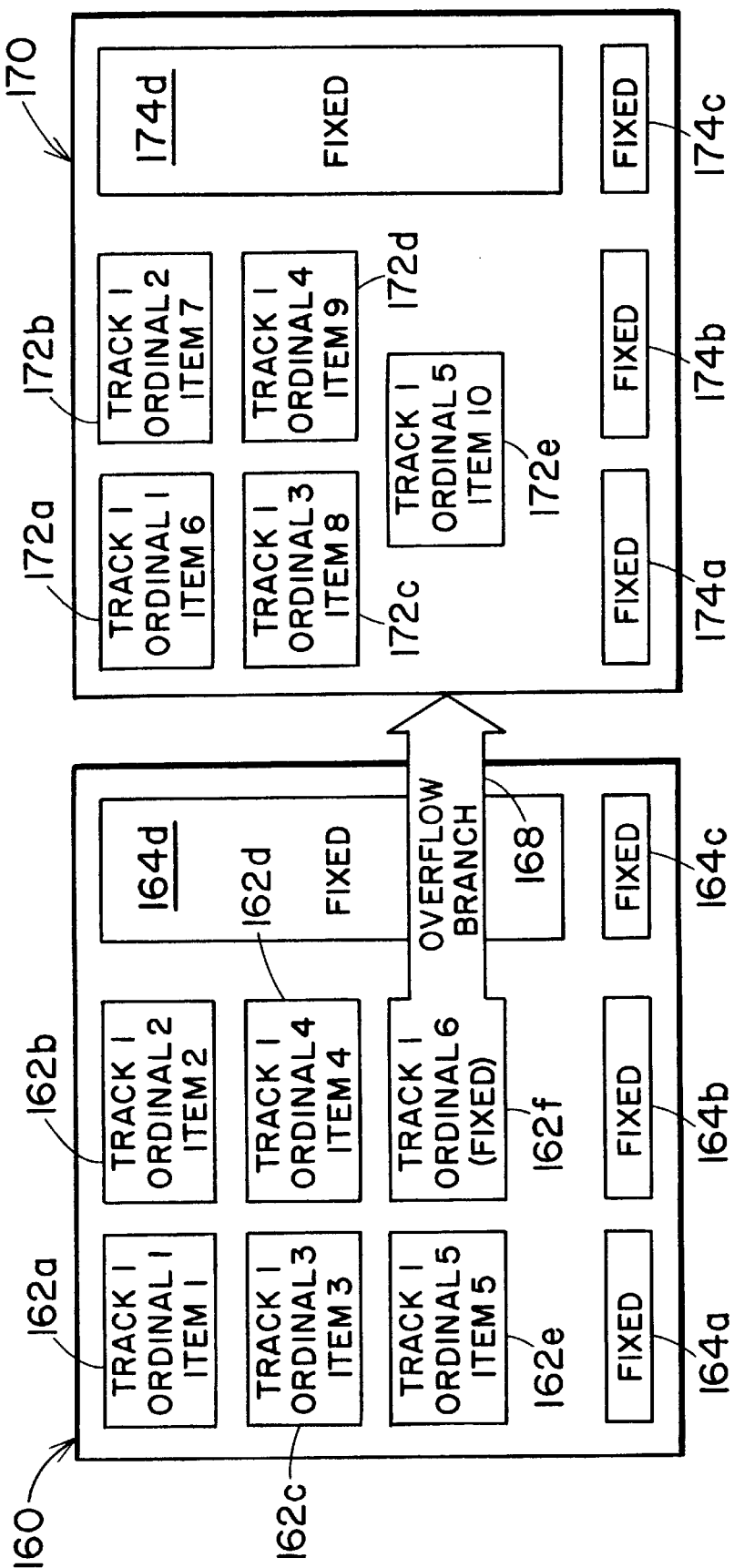
FIG. 8 is a schematic of two template presentation displays (160, 170) of the invention, each display has cells associated with items for sale. The right-hand display is an overflow screen, only seen if certain conditions have been met, that is tied with a special cell location called an overflow branch cell.

FIG. 8 illustrates two original template displays 160, 170 having cells of one category of items for sale (all given a track number 1). Display 170 is, therefore, an "overflow" display tied to an overflow cell 162f (this association is represented by arrow 168). Template displays 160, 170 show that a total of ten items of the track 1 category are possible for inclusion in a final customer presentation. Item cells include 162a through 162e and 172a through 172e. Fixed cells 164a through 164d of display 160 are not associated with any particular item, as are fixed cells 174a through 174d of display 170. They are of the same character as cells 154a through 154f as explained in connection with FIG. 7. Preferably, fixed general cells 164d, 174d are fixed "order windows". Cells 164c, 174c could enclose "EXIT to PAY" icons which, when interacted-with by a customer, allow the customer to discontinue ordering.

Note that overflow cell 162f is fixed on display 160 and is only configured as active for presentation to a customer if certain conditions have been met. If six track 1 items are included in a database created for configuration with template displays (160, 170), overflow cell 162f will be activated during configuration (and will display the icon for the sixth item). If seven or more items are included in a database configured for presentation to a customer, overflow cell 162f will enclose a "MORE ITEMS" icon (which when interacted-with, by touching for example, will call-up display 170 to present the seventh, and so on, items). Cell activation will be described in detail in connection with FIGS. 9, 10, 12, 13 (in conjunction with TABLES A, B, C).

Figure 9:
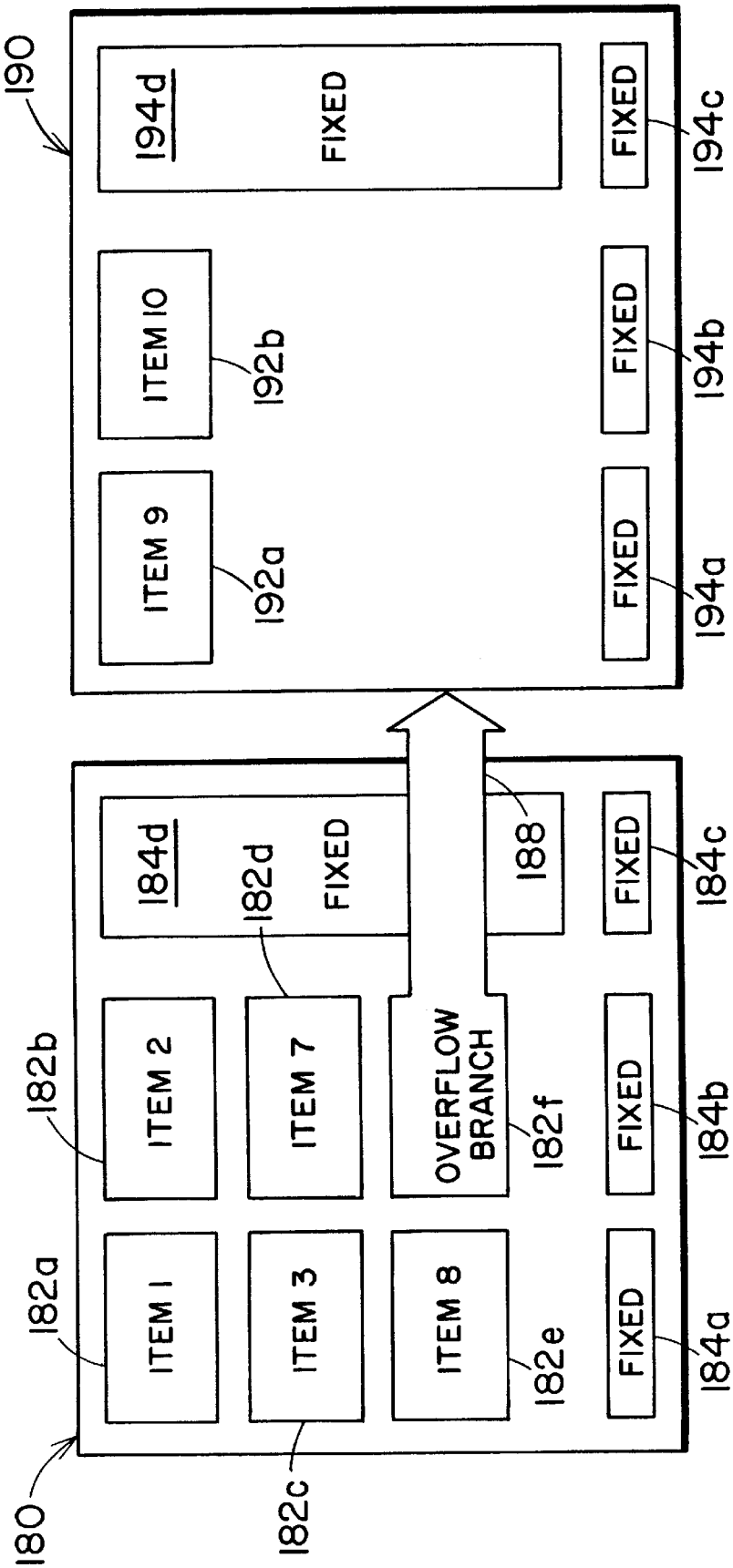
FIG. 9, like FIG. 8, illustrates two presentation displays (180, 190) having been configured to present seven items (all of one category) for sale to a customer. Displayed in the left-hand display is a branch cell that will call-up the right-hand display of two more items (numbered 9 & 10), when touched (or otherwise activated by a customer).

FIG. 9 shows two displays 180, 190 configured (using FIG. 8 template displays 160, 170) for presentation to a customer via an electronic device. Configured displays 180, 190 include item (1) in cell 182a, item (2) in cell 182b, item (3) in cell 182c, item (7) in cell 182d, item (8) in cell 182e, item (9) in cell 192a, and item (10) in cell 192b. In order to be included as part of configured displays 180, 190, all seven of these items must have been included in the database provided for this customer presentation. As was discussed in connection with FIG. 8, since more than six items of track 1 category were chosen for inclusion in the database used during configuration, the fixed overflow cell 182f will have the "MORE ITEMS" icon so that overflow display 190 can be called-up. Note that fixed general cell locations 164a through 164d of template display 160 in FIG. 8, become fixed cells 184a through 184d of configured display 180. Similarly, fixed general cell locations 174a through 174d of template display 170 in FIG. 8, become fixed cells 194a through 194d of configured display 190.

Figure 10:
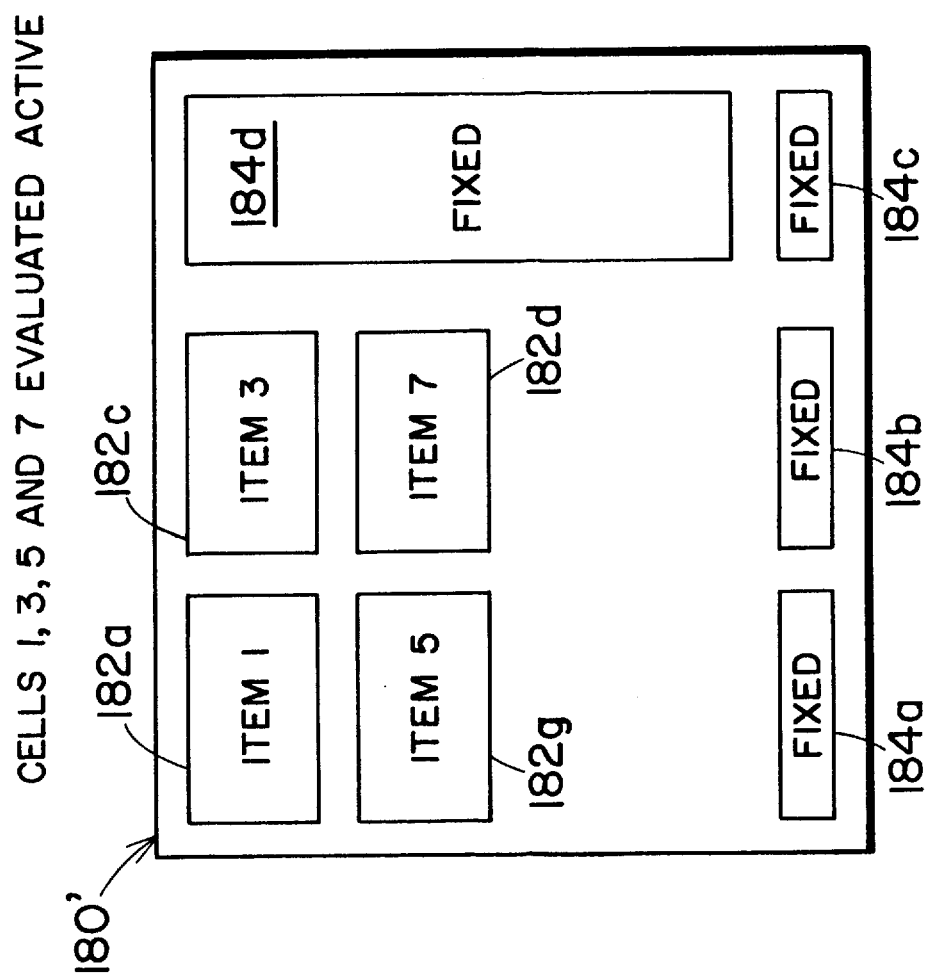
FIG. 10 illustrates a configured display of the invention with four cells associated with four items, rather than seven items as is seen in the displays of FIG. 9. No branch cell or overflow screen are needed since all four items (of one category) fit on one display.

FIG. 10 shows configured display 180' with item (1) at cell 182a, item (3) at cell 182c, item (5) at cell 182g, and item (7) at cell 182d. Thus, as can be seen, only four items of the ten possibilities in FIG. 8 template displays 160, 170, were chosen for inclusion in the database used during configuration to produce display 180'. Again, note that fixed general cell locations 164a through 164d of template display 160 in FIG. 8, are all activated during configuration to become fixed cells 184a through 184d of configured display 180'. To further explain the configuration process, turn to the TACOS and TACO OVERFLOW screen data records in TABLES A, B, C. In TABLE A, these two screens itemize ten possible taco-related items (just as the template displays in FIG. 8 have ten possibilities). By matching item identifier-strings in TABLES A and B, it is clear that only item (1) REGTACO, item (3) TACO-SUP, item (5) SOFTTACO, and item (7) BEANTACO of the TACO and TACO OVERFLOW screens are found in both the TABLE A TEMPLATE and the TABLE B DATABASE. TABLE C also illustrates this. Therefore, in this example, only the graphic or text icons (as well as any animation, video, or audio messages) associated with these four common items will be presented in the four item cells 182a, 182c, 182g, 182d of configured display 180'.

Figure 11:
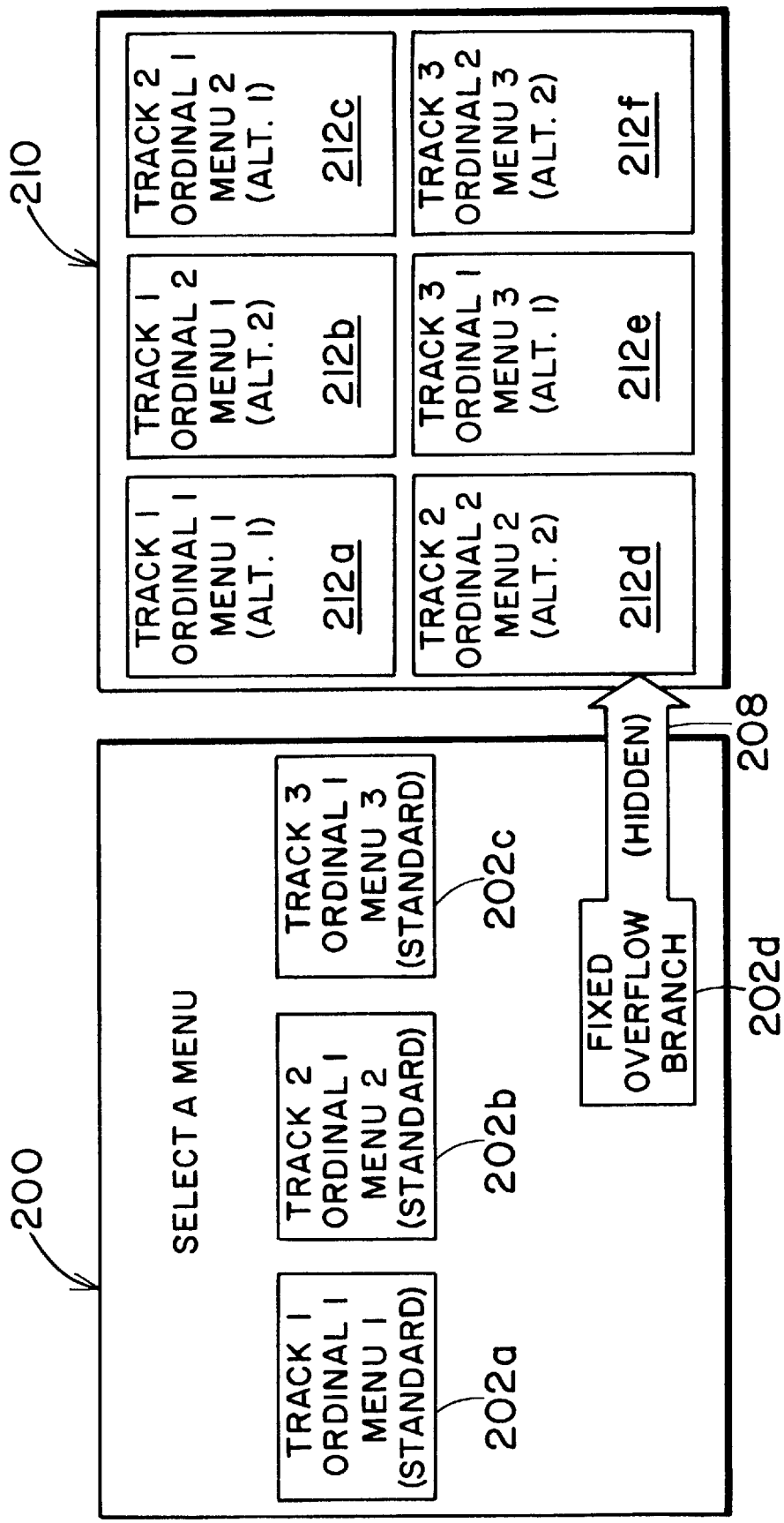
FIG. 11 is a schematic of two template presentation menu displays (200, 210) of the invention, each display has cells associated with categories of items for sale. Displayed in the left-hand display is a hidden branch cell. The right-hand display is a hidden overflow screen (never seen in a presentation to a customer) that is tied with a hidden overflow branch cell of the left-hand screen.

FIG. 11 illustrates how menu branch cells of a template presentation can be organized on a template menu display 200 and its hidden overflow display 210. Each menu cell is considered a "branch" cell because it can call-up/point to another display—in the case of a menu branch cell, it typically calls-up a display containing a category of items (e.g., a TACO menu branch cell will be associated with TACOS screen(s), or a DRINKS menu branch will call-up DRINKS screen(s) as illustrated in TABLES A, B, C). The three menu branch cell locations 202a through 202c are each associated with their own track of items. A "hidden" overflow branch cell 202d has been associated (as represented by an arrow 208) with a hidden overflow menu display 210 that contains two alternate menus for each display 200 menu: track #1 has alternates at cells 212a, 212b; track #2 has alternates at cells 212c, 212d; and track #3 alternates are at cells 212e, 212f. This allows for great flexibility in choosing different menus when creating or modifying the database. Hidden overflow branch cell 202d will not be seen in a customer presentation, it merely provides a way to store and use for presentation, alternate menu cells.

Figure 12A:
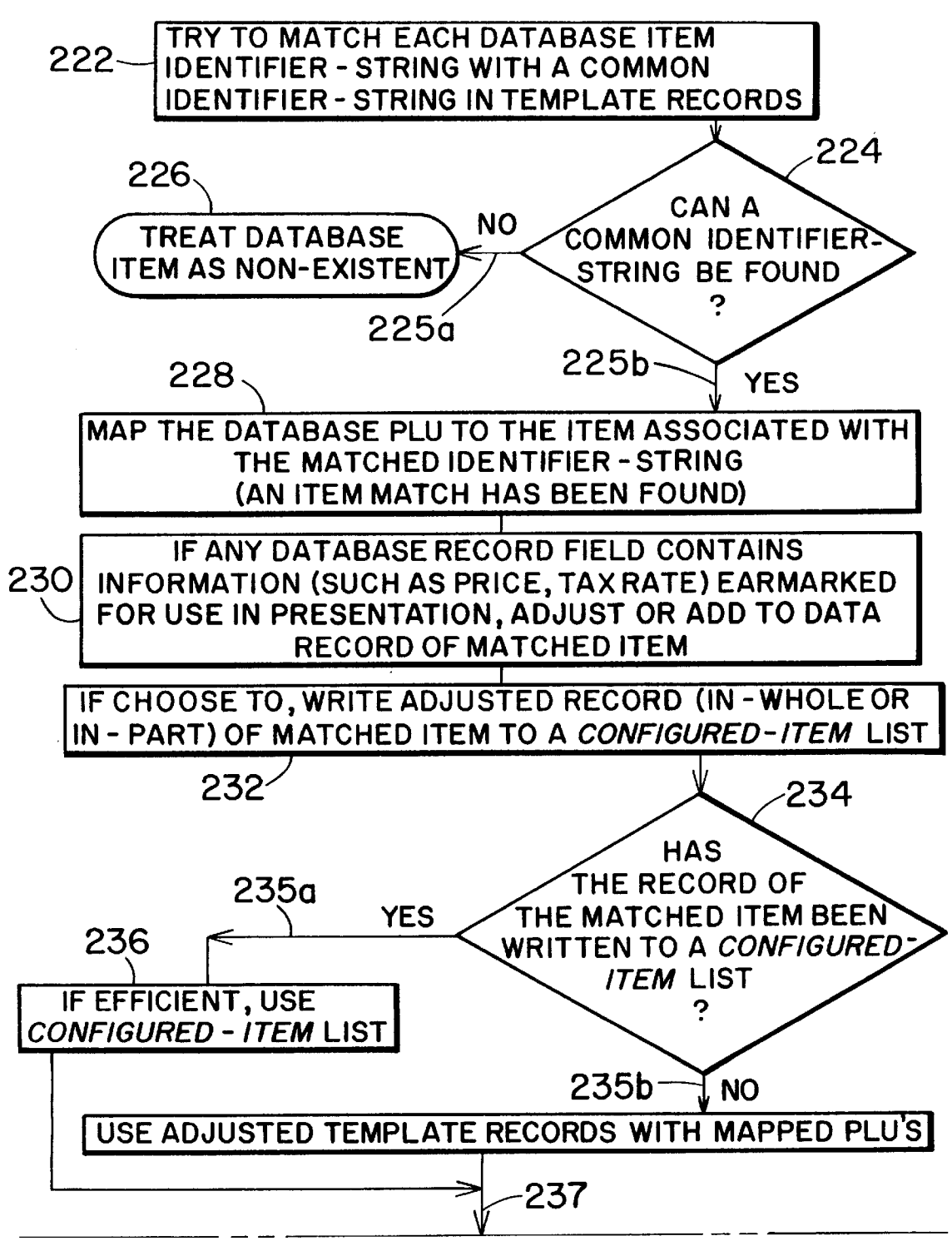
FIG. 12 is a flow diagram illustrating details of a preferred configuring process of the invention (see, also, TABLES A, B, and C in connection with FIG. 12).
Figure 12B:
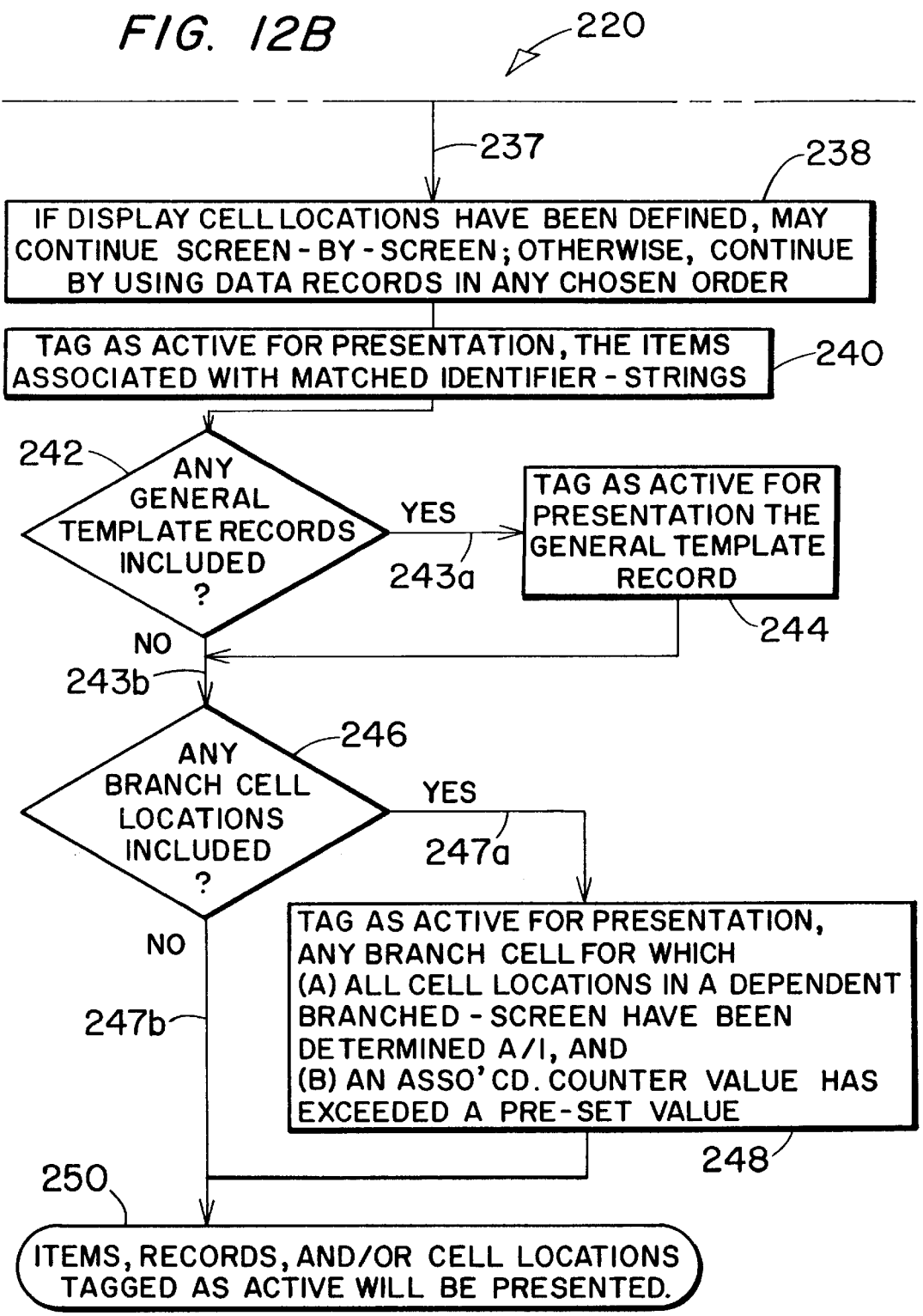

The flow diagram in FIG. 12 provides (at 220) preferred configuration details. As explained with FIG. 3, a template presentation can be created on a computer (using well known tools and techniques) with available components 62, 64, 66 and new template records and instructions (shown at 68). The template can be created at many different locations (such as at the facility with managing responsibility of the sales outlet, on a different floor or office of the building in which the sales outlet is located, at a third party service/support provider's facility, etc.,) to include a complete listing of available items and their associated characteristics, dialog control file default parameters, instructions, etc. A site-specific database (as represented at 86 in FIG. 3) can be generated (using well known tools and techniques) to include items intended for sale at a sales outlet. FIG. 12 illustrates a preferred method of configuring the template and database for presentation to a customer. Writing code (using a computer language of choice) to implement the configuration process of the invention, can be readily done by those skilled in the art using the information contained herein. Configuring can begin, at 222, with the matching of template and database item identifier-strings (or other "key") —see TABLES A, B, and C. Items for which no common identifier-string can be found in the template (following arrow 225a), are treated as non-existent 226 (see, also, the far right-hand column in TABLE B). If an item identifier-string match can be made 224, 225b, the database PLU number of that matched item is then mapped 228 for use during configuring (and for subsequent use in ordering items from the sales outlet inventory/stock area).

Shown next in FIG. 12 at 230, is a preferred point at which the following can be addressed: (a) discrepancies between data records (or other information) of the database and original template, (b) any modifications made to the database, and (c) any updating done to the template presentation. Several possibilities exist in connection with handling (a) discrepancies between information in the database and original template. To the extent the database records contain the most-current information (especially local prices and local tax rates), then discrepancies need to be resolve by writing over template data fields. To the extent the template presentation contains the most-current information (or, perhaps, the template contains the only information—for example, certain instructions/dialog control files will, preferably, be absent from the database), discrepancy resolution results in writing over database records (and where instructions/dialog control files, etc., are a part of the template and missing from the database, template files will be used during configuration). Turning next to (b) database modifications, as was mentioned earlier, it is preferable to detect which portion of the customer presentation will be affected by any modification made, and then change the affected portion. Similarly, in the case of (c) template updates, although slightly more complex to accomplish, the process of detecting which portion of the customer presentation will be affected by the updates is also preferred. Computer code can be readily written for this step 230 that addresses and handles (a) database-template discrepancies, (b) database modifications, and (c) template updates, to produce an up-to-date set of records and instructions during configuration.

Next, it may be desirable to write the matched items to a CONFIGURED item-LIST (following steps 232, 234, 236 along arrow 235a) that includes the mapped PLU numbers (TABLE C is an example of the CONFIGURED-item LIST). This type of LIST might be useful to optimize the configuration process by allowing for comparison between LISTs generated during previous configurations, and to aid in diagnosing configuration problems/bugs. If no CONFIGURED item-LIST is desired (following arrow 235b), the template records are used. PLU numbers should then be mapped to the template presentation. As mentioned earlier, a sales outlet typically has attached its own numeric string (for example, a three-digit PLU number) to each of the items for sale at the outlet. It is preferred to allow each sales outlet to continue to use its own internal item-ordering computer hardware and algorithms for ordering from inventory and data analysis. The new process and system of the invention make this possible by proper mapping of PLU numbers. Remember that if no CONFIGURED item-LIST (such as TABLE C) is written and, instead, the template presentation is used, the template must be adjusted to contain the most-current information. Arrow 237 leads into the method of "tagging" cells or other data records to tailor the presentation to outlet customers.

Figure 13:
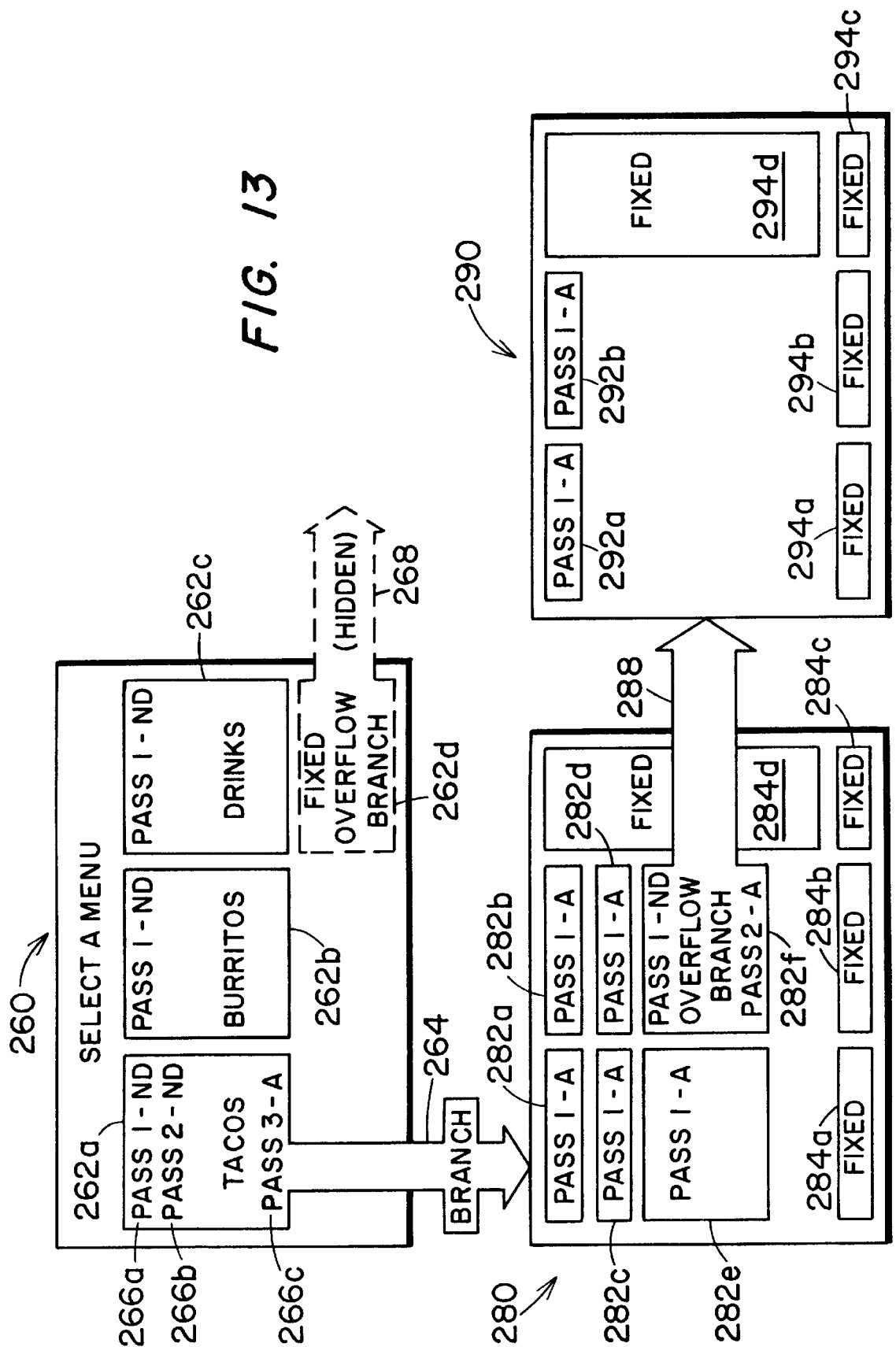
FIG. 13 is a schematic representing three configured displays of the invention (see, also, TABLES A, B, and C in connection with FIG. 12).

The "tagging" of data records during configuration will be explained in connection with both displays 180, 190 in FIG. 9, left-hand display 200 of FIG. 11, the flow chart in FIG. 12, and displays 260, 280, 290 in FIG. 13. By way of example and for simplicity, these figures represent cell locations that can be displayed on computer monitor, video, and television screens. Nevertheless, in the event a presentation is made to a customer via an sound-presentation-only electronic device (telephone, speaker, etc.), sequenced audio messages can likewise be organized into groups and tagged for presentation. Additionally, an icon (including graphics and/or alphanumeric characters) enclosed within a cell location can be replaced with an animated (motion-graphics) or video message. Furthermore, a cell location can be associated with an animated, video, or audio message presented after interaction with the cell by a customer (e.g., after a cell on a screen is touched by the customer, or an associated message is seen or heard).

Turn, first, to the middle of FIG. 12 at box 238. If the electronic device has a screen and the template item information has been organized by screens, tagging of data records for presentation is preferably done screen-by-screen. If no such screen is available for presentation, tagging of data records is done in a sequenced fashion—preferably in a manner consistent with the way records have been organized in the template presentation. Since every matched item is intended for sale, these should be tagged active 240 (represented by an "A" in the right-hand columns of TABLES A and C). Display 280 in FIG. 13 illustrates that the tagging "A" for presentation of matched item records can be done in a first pass ("pass 1") of all screens in the template presentation. During pass 1, any general template record (such as fixed general cells 284a through 284d of display 280 and 294a through 294d of overflow display 290) can also be tagged active for display (see 242, 243a, 244 in FIG. 12). Note that, during pass 1, branch cells (e.g., FIG. 13 menu branch cells 262a through 262c and overflow branch cell 282f) are not determinable ("pass 1—ND" as shown at 266a for cell 262a). This is due to the organization by-screen of different cell types and because a screen-by-screen tagging method is being used here. In FIG. 13, until all items associated with track 1 on displays 280, 290 are determined active or inactive, overflow branch cell 282f cannot be determined active (for displaying either a "MORE ITEMS" or a sixth-item icon). Likewise, menu branch cell 262a cannot be determined active until all items on its branch displays 280, 290 (this association is represented by arrow 264) have been determined active or inactive. Note that dashed-line overflow branch cell 262d will not be included in a customer presentation.

The following pseudocode describes, generally, one embodiment of the configuration operation for use with an a monitor and customer-interactive screen:

1. Retrieve current POS structures.
2. Create store buffer file(s), if desired, that include template buffer files, database records/modifications (including default parameter settings and dialog control files).
3. Build a CAT item list
{
    for each item in the item template
    {
    Use the designated POS key (such as item abbreviations) to match the items in the POS item-identifier string to database PLU's and convert the POS string to real PLU values.
    If the match is invalid
    then
        mark the item as non-existent.
    otherwise
    {
        Adjust the item price to the price specified in the POS database. If the POS string refers to more than one PLU, then the price will be the addition of the prices of the individual components.

```
            Adjust the tax codes to what the POS specifies.
         }
      Write the configured item to the CAT item list.
      }
   }
4. Configure Screen Cells to determine if active
{
   Pass 1
   {
      for each cell on every screen in the template item files
      {
         if configuration instructions specify that the cell
               depends on a tag counter
            then
            {
               if this cell has a counter tag associated with it
                     then
                  Increment a Pending Counter for this counter
                     variable. The Pending Counter keeps track of
                     how many cells affecting a given counter
                     have not been configured yet.
                  no other processing of this cell during this pass.
            }
            otherwise, if the cell is a hidden overflow branch cell
            {
               Mark the cell as inactive.
            }
            otherwise
            {
               Perform the configuration instructions for the cell.
               Mark the cell active or inactive depending upon
                  instruction results.
               If cell is active, increment appropriate tag
                  counter.
            }
      }
   }
   Pass 2 - N: while all cells are not configured and as long as at
      least one cell is configured during each loop
   {
      for all cells not configured yet on every screen in the
         template
      {
         if the cell instructions depend on a counter that has a
               Pending Count not, yet, equal to 0
            then
               skip this cell for this pass.
            otherwise
            {
               Compute the configuration instructions
               Mark the cell as active or inactive depending
                  upon results.
               If the cell affects a counter
                  then
                  {
                     if the cell is active, increment counter.
                     if the counter has a Pending Count, then
                        decrement the count.
                  }
            }
      }
   }
   If configuring stops because no changes were made in the last
         loop, but there are still unconfigured cells,
      then
      {
         for all cells on all screens that are still not configured
         {
            write an error message to a configuration report.
            mark cell as inactive.
         }
      }
   Add counter data to store buffer files, if created and a variable
      referencing the counters have been defined, for reference by
      dialog control file programs.
}
5. Create the CAT presentation
   {
      for every screen in the template that is not an overflow screen
```

```
      {
         for each fixed cell on the screen
         {
            if the cell is inactive, then make it blank.
         }
         for each cell group on this screen and its
               overflow
         {
            Move active cells to fill in locations vacated by
               inactive cells.
            Special Conditions:
            1. Cells maintain their relative ordering.
            2. The overflow branch pointer cell on a main screen
               or its overflows can be replaced with an item cell
               if the overflow branch screen will not be needed, or
               if the overflow branch cell is inactive.
            3. Active tracked cells that are fixed in position should
               not be relocated. Other tracked cells should flow
               around them.
         }
         If changes have been made that effect the screen layout
            then
               Compile the graphic for the main screen and any
                  overflow screens that were required.
      }
   }
```

The tagging of branch cells, as described above, has been represented in FIG. 12 at 246, 248 along arrow 247a. Return, again, to the tagging of FIG. 13 overflow branch cell 282f: it will be tagged active if a counter value (which has been "counting" all the activated track 1 item cells as tagging takes place) reaches six. If the counter value equals six, activated cell 282f will display the sixth item. If the counter value reaches seven or more, cell 282f will display a "MORE ITEMS" icon as previously discussed. When this screen-by-screen tagging method is employed, in general, a branch cell can be determined active or inactive only after all cells have been determined on a dependent branching display (such as display 280). Thus, overflow branch cell 282f can only be determined active during a later pass ("pass2") through the screens. In the case of menu branch cell 262a, it will be tagged active in this example during a subsequent pass of the screens (represented by "pass3–A" at 266c). This is because it will take at least a second pass (here, represented "pass2") of the screens to finally determine whether all branching display cells located on displays 280, 290 are active or inactive. Likewise, in the event an additional level of branching is desired to call-up menu display 260, the additional-level branch cell cannot be determined active or inactive until all menu cells on 260 have been determined. Thus, a subsequent "pass4" (not shown) of the screens could be done.

In the flow diagram of FIG. 12, arrows 243b and 247b represent it is possible that no general template records and/or branch cells are included in a template undergoing configuration. To complete the process, 250 illustrates that data records tagged as "active" for presentation, will become part of the presentation made to a customer. Computer routines (such as that shown at 92 as Waitor) and tools for downloading and presenting, via an electronic device, the configured presentation, are readily coded.

While certain representative embodiments and details have been shown for the purpose of illustrating the invention, those skilled in the art will readily appreciate that various modifications may be made to the invention without departing from the novel teachings or scope of this invention. Accordingly, all such modifications are intended to be included within the scope of this invention as defined in the following claims. In the claims, any means-plus-function clauses used are intended to cover the structures described herein as performing the recited function and not only structural equivalents but also equivalent structures (an example of the latter being a nail and screw in the environment of fastening parts).

What is claimed is:

1. A process for configuring electronic information for presentation at an interactive electronic device with which an item may be ordered, comprising the steps of:

providing an original template presentation created at a first location to include a plurality of template items;

providing a database to include a plurality of local database items; and configuring, using a local computer, the information to include each of said template items that is also one of said database items.

2. The process of claim 1 further comprising the steps of:

modifying, as desired, any part of said database;

providing updates, as desired, to said original template presentation; and prior to said step of configuring, determining whether said step of configuring is required.

3. The process of claim 2 wherein said step of determining whether said step of configuring is required comprises the steps of:

determining whether said original template presentation has been updated;

determining whether said database has been modified;

if either said original template presentation has been updated or said database has been modified, performing said configuring; and if said original template presentation has not been updated and said database has not been modified and said step of configuring has not yet been performed, performing said configuring.

4. The process of claim 3 wherein:

said original template presentation further comprises a first set of instructions for carrying out said step of determining whether said step of configuring is required and a second set of instructions for carrying out said configuring step;

said modifying step comprises adding a new item; and said providing updates step comprises changing said second set of instructions so that presentation of said new item is time-dependent.

5. The process of claim 1 wherein each of a template data record of said template presentation comprises a plurality of item-characteristic fields, and the interactive electronic device is located at, and any modifying of said database takes place at, a second location; and further comprising the step of providing updates by changing, at said first location, any of said item-characteristic fields and transmitting any said updates to said computer.

6. The process of claim 5 wherein said plurality of database items comprises those items intended for sale at said second location, and said step of configuring occurs before said step of providing updates; and further comprising, after said step of configuring, the step of re-configuring the electronic information to include each of said updates associated with a template item that is also one of said database items.

7. The process of claim 5 wherein:

said template presentation further comprises a plurality of cells for a display screen, each of which is associated with one of said template items;

said step of providing updates occurs before said step of configuring; and said step of configuring further comprises arranging said cells on said screen.

8. The process of claim 1 wherein:

the interactive electronic device comprises a display monitor with a touch screen for receiving an order;

said template presentation further comprises a branch cell, and a general template cell not associated with any particular item; and said step of configuring further comprises the steps of: tagging as active for display, an item cell associated with each said template item that is also one of said database items; tagging as active for display, said general template cell; and tagging as active for display, any said branch cell that points-to an associated screen having at least one said tagged template item cell.

9. The process of claim 8 wherein:

each of said template item cell and said general template cell having been arranged by screen for said display monitor;

said steps of tagging as active for display said template item cells and said general template cells, are completed in a first pass, one screen at a time; and said step of tagging as active for display said branch cell, is completed in a second pass, one screen at a time.

10. The process of claim 1 wherein said step of configuring further comprises:

matching a local key in a local data record of said database with a common key in a template data record of said template presentation;

treating as non-existent, any of said local data records for which no common key can be found so that an associated database item is not presented at the interactive electronic device; and tagging as active for presentation, each of said template data records which has been so matched.

11. The process of claim 1 wherein:

the interactive electronic device comprises an audio communication apparatus for receiving an order from a customer;

said template presentation comprises a general template data record not associated with any particular item; and each said general data record comprises a pre-recorded audio message having been arranged in a presentation sequence for said communications apparatus.

12. The process of claim 11 wherein said step of configuring further comprises:

matching a local key in a local data record of said database with a common key in a template data record of said template presentation;

treating as non-existent, any of said local data records for which no common key can be found so that an associated database item is not presented at the communications apparatus; and tagging as active for presentation, each of said template data records which has been so matched.

13. A process for presenting display information at an interactive electronic device with which an item may be ordered, comprising the steps of:

providing an original template presentation created at a first location to include a plurality of template items;

providing a database to include a plurality of local database items; and configuring the display information for presentation, comprising the step of tagging as active for display, an item cell associated with a template item that is also one of said database items.

14. The process of claim 13 wherein:

the interactive electronic device comprises a display monitor and a touch screen for receiving an order;

said template presentation further comprises a general template cell not associated with any particular item, each of said template item cells and said general template cell having been arranged by screen for said display monitor; and said step of configuring further comprises the step of tagging as active for display, said general template cell.

15. The process of claim 13 wherein:

the interactive electronic device comprises a flat-panel LCD apparatus with a touch screen for receiving an order;

said template presentation further comprises a branch cell, each of said template item cells having been arranged by screen for said apparatus; and said step of configuring further comprises the step of tagging as active for display, said branch cell if an associated counter value has exceeded a first pre-set value.

16. The process of claim 13:

wherein the interactive electronic device comprises a display monitor with a key board for receiving an order from a customer;

wherein said template presentation further comprises a branch cell, each of said template item cells having been arranged by screen for said display monitor, and an overflow screen associated with said branch cell;

wherein said step of configuring further comprises the steps of tagging as active for display, any said branch cell that points-to any said overflow screen having at least one said tagged template item cell; and further comprising the step of presenting said overflow screen if an associated counter value has exceed a second pre-set value.

17. A system for configuring electronic information for presentation at an interactive electronic device with which an item may be ordered, comprising:

an original template presentation created at a first location to include a plurality of template items;

a database to include a plurality of local database items;

a communications medium for transmitting said original template presentation to a local computer; and said template presentation also including a set of instructions for configuring, using said computer, the information to include each of said template items that is also one of said database items.

18. The system of claim 17 wherein:

the interactive electronic device comprises a display monitor with a touch screen for receiving an order and said communications medium comprises coaxial cables;

said template presentation further comprises a plurality of cells for a display screen, each of which is associated with one of said template items; and said set of instructions for configuring further comprises arranging on said screen, each of said cells associated with one of said template items that is also one of said database items.

19. The system of claim 18 wherein:

said template presentation further comprises a set of instructions for determining whether said configuring is required;

each of a template data record of said template presentation comprises a plurality of item-characteristic fields; and said set of instructions for configuring further comprises tagging as active for display, each of said cells associated with one of said template items that is also one of said database items.

20. The system of claim 17:

wherein the interactive electronic device comprises a flat-panel LCD apparatus with a touch screen for receiving an order;

wherein said communications medium comprises a satellite link transmission medium, a transmitter, and a receiver; and further comprising a set of instructions for re-configuring, using said computer, the electronic information to include any modifications made to said database and any updates made to said template presentation after said configuring.

21. The system of claim 17 wherein:

the interactive electronic device comprises an audio communication apparatus for receiving an order;

each of a template data record of said template presentation comprises a pre-recorded audio message having been arranged in a presentation sequence for said communications apparatus; and said communications medium comprises telephone transmission wires.

22. The system of claim 21 wherein:

said audio communication apparatus is located at a second location;

said set of instructions for configuring further comprises matching a local key in a local data record of said database with a common key in one of said template data records, and tagging as active for presentation, each of said template data records which has been so matched; and updates to said original template presentation, and modifications to any part of said database, are made as desired.

* * * * *